(12) United States Patent
Inatani et al.

(10) Patent No.: US 11,609,428 B2
(45) Date of Patent: Mar. 21, 2023

(54) INFORMATION PROCESSING APPARATUS AND INFORMATION PROCESSING METHOD

(71) Applicant: SONY CORPORATION, Tokyo (JP)

(72) Inventors: Soichiro Inatani, Tokyo (JP); Kenji Sugihara, Kanagawa (JP); Mari Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 16/640,464

(22) PCT Filed: May 31, 2018

(86) PCT No.: PCT/JP2018/020896
§ 371 (c)(1),
(2) Date: Feb. 20, 2020

(87) PCT Pub. No.: WO2019/044084
PCT Pub. Date: Mar. 7, 2019

(65) Prior Publication Data
US 2020/0218072 A1 Jul. 9, 2020

(30) Foreign Application Priority Data
Aug. 29, 2017 (JP) .............................. JP2017-164045

(51) Int. Cl.
G02B 27/01 (2006.01)
G02B 27/00 (2006.01)
G06F 3/01 (2006.01)

(52) U.S. Cl.
CPC ..... *G02B 27/0172* (2013.01); *G02B 27/0093* (2013.01); *G06F 3/013* (2013.01); *G02B 2027/014* (2013.01)

(58) Field of Classification Search
CPC .......... G02B 2027/014; G02B 27/0093; G02B 27/0172; G02B 27/017; G06F 3/013;
(Continued)

(56) References Cited

U.S. PATENT DOCUMENTS

2002/0191840 A1 12/2002 Ochi et al.
2011/0234475 A1* 9/2011 Endo ...................... G09G 3/001
345/8
(Continued)

FOREIGN PATENT DOCUMENTS

CN 105983234 A 10/2016
CN 106054870 A 10/2016
(Continued)

OTHER PUBLICATIONS

International Search Report and Written Opinion of PCT Application No. PCT/JP2018/020896, dated Jul. 31, 2018, 09 pages of ISRWO.

(Continued)

*Primary Examiner* — Temesghen Ghebretinsae
*Assistant Examiner* — Sosina Abebe
(74) *Attorney, Agent, or Firm* — Chip Law Group

(57) ABSTRACT

Provided is an information processing apparatus that includes a line-of-sight information acquisition unit which acquires line-of-sight information related to a line-of-sight direction of a user, a movement information acquisition unit which acquires a center-of-gravity movement information related to a center-of-gravity movement direction of a body of the user, and a display control unit which performs a first display control for controlling a display device by moving a viewpoint of the imaging unit in the center-of-gravity movement direction while substantially maintaining the imaging posture of the imaging unit when the line-of-sight direction and the center-of-gravity movement direction are substan-
(Continued)

tially parallel and performs a second display control for controlling the display device by rotating the imaging posture of the imaging unit and moving the viewpoint of the imaging unit in the center-of-gravity movement direction when the line-of-sight direction and the center-of-gravity movement direction are not substantially parallel.

19 Claims, 24 Drawing Sheets

(58) Field of Classification Search
CPC . G06F 3/01; G06F 3/011; G06F 3/012; G06F 3/0346; G06F 3/038; G06F 3/0484; G06F 3/0487; G06T 19/00; H04N 7/183; H04N 13/332; H04N 13/344; H04N 13/366
See application file for complete search history.

(56) References Cited

U.S. PATENT DOCUMENTS

| | | | | |
|---|---|---|---|---|
| 2012/0229372 | A1* | 9/2012 | Hayashi | A63F 13/5255 345/156 |
| 2012/0229516 | A1* | 9/2012 | Matsunaga | A63F 13/5258 345/659 |
| 2014/0364212 | A1* | 12/2014 | Osman | A63F 13/26 463/31 |
| 2016/0297522 | A1* | 10/2016 | Brulez | A63H 27/12 |
| 2017/0083084 | A1* | 3/2017 | Tatsuta | G06F 3/0346 |

FOREIGN PATENT DOCUMENTS

| | | |
|---|---|---|
| CN | 106415447 A | 2/2017 |
| EP | 2497547 A2 | 9/2012 |
| EP | 3078402 A1 | 10/2016 |
| EP | 3163422 A1 | 5/2017 |
| FR | 3034681 A1 | 10/2016 |
| JP | 01-252992 A | 10/1989 |
| JP | 2005-056442 A | 3/2005 |
| JP | 2011-203446 A | 10/2011 |
| JP | 2013-088838 A | 5/2013 |
| JP | 2014-120042 A | 6/2014 |
| JP | 2016-199261 A | 12/2016 |
| KR | 10-2017-0028313 A | 3/2017 |
| WO | 2009/128181 A1 | 10/2009 |
| WO | 2016/002318 A1 | 1/2016 |

OTHER PUBLICATIONS

Office Action for CN Patent Application No. 201880054567.3, dated Jan. 26, 2022, 04 pages of English Translation and 04 pages of Office Action.

Office Action for CN Patent Application No. 201880054567.3 dated Sep. 13, 2021, 5 pages of Office Action and 8 pages of English Translation.

* cited by examiner

FIG.1
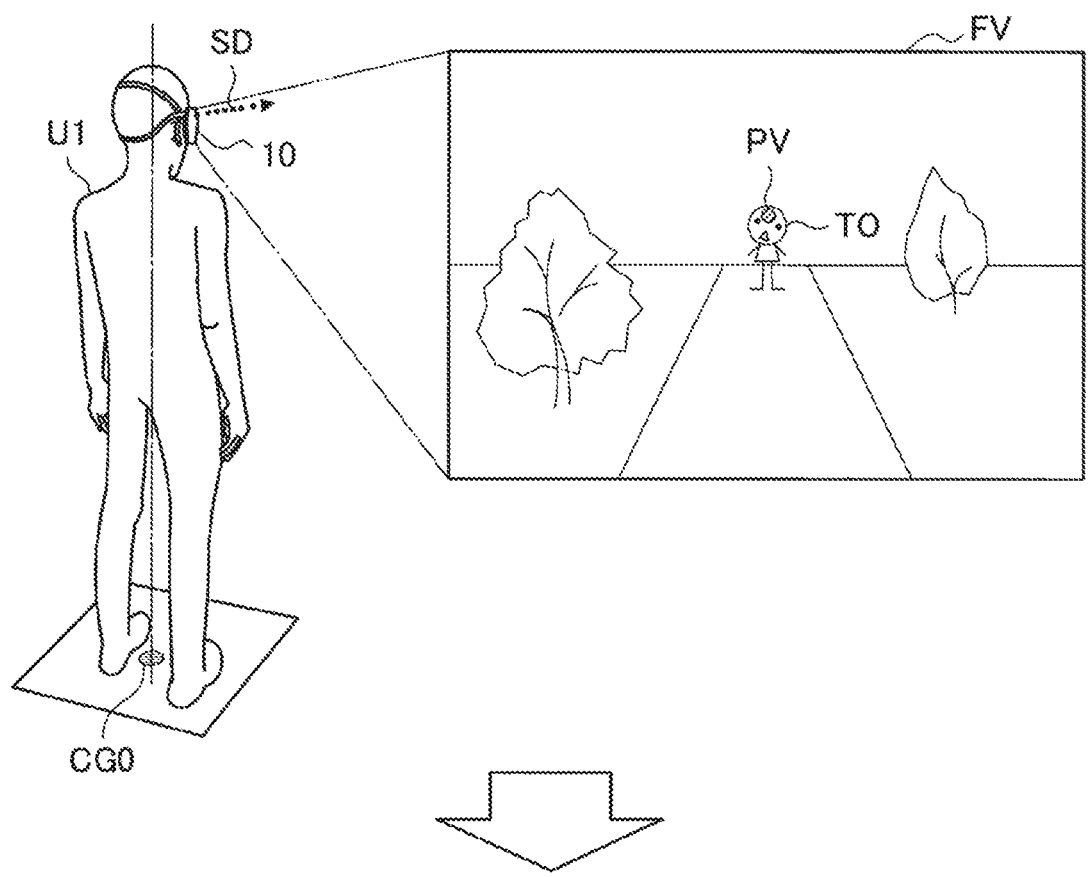
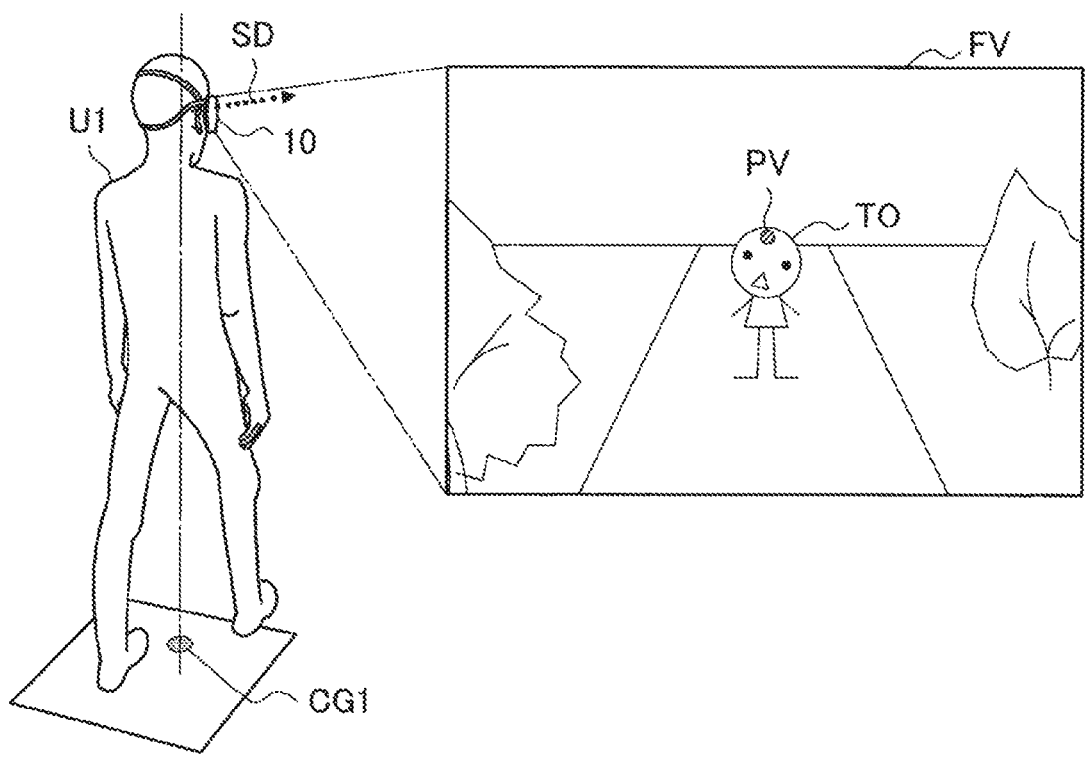

FIG.9
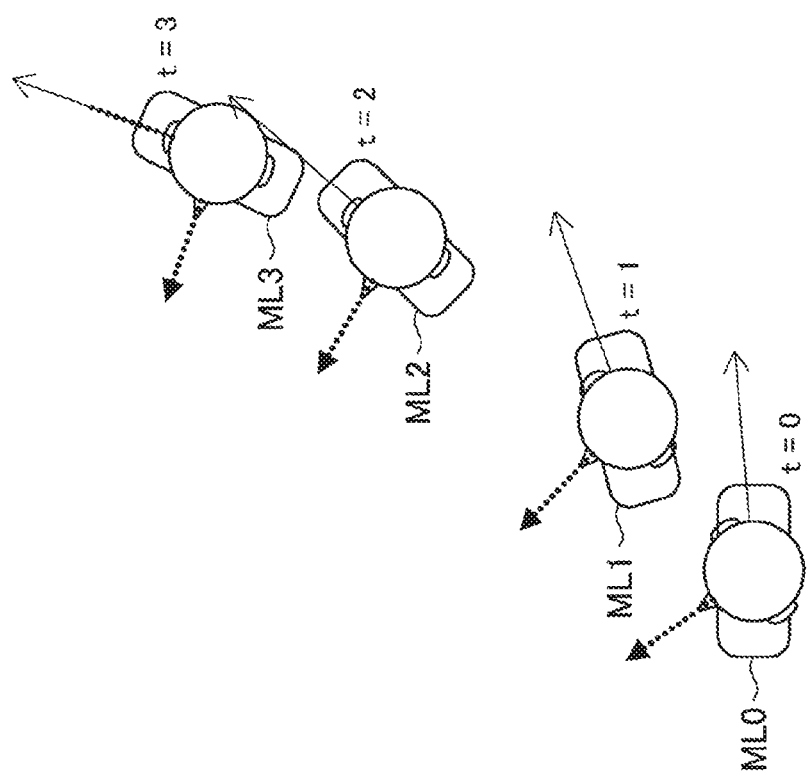

FIG.10
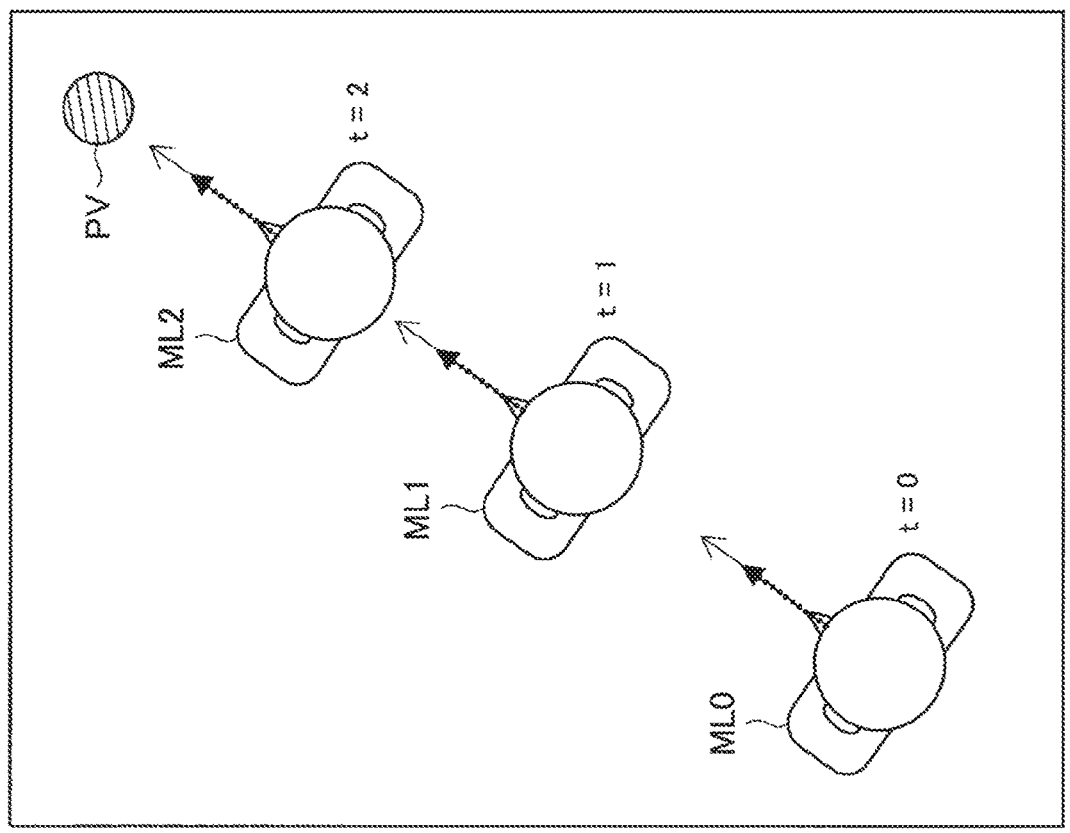
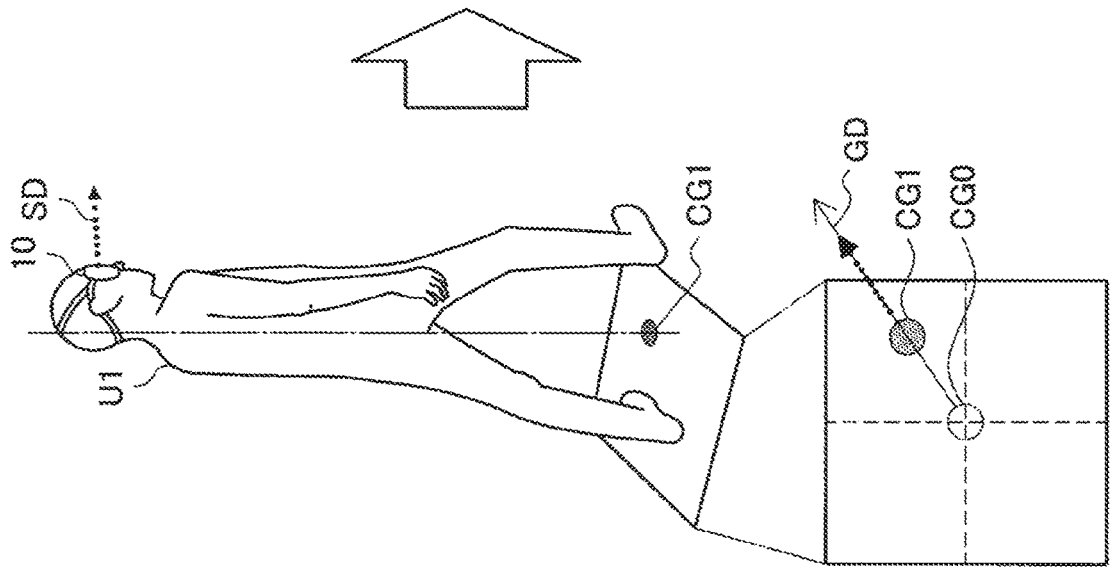

FIG.11
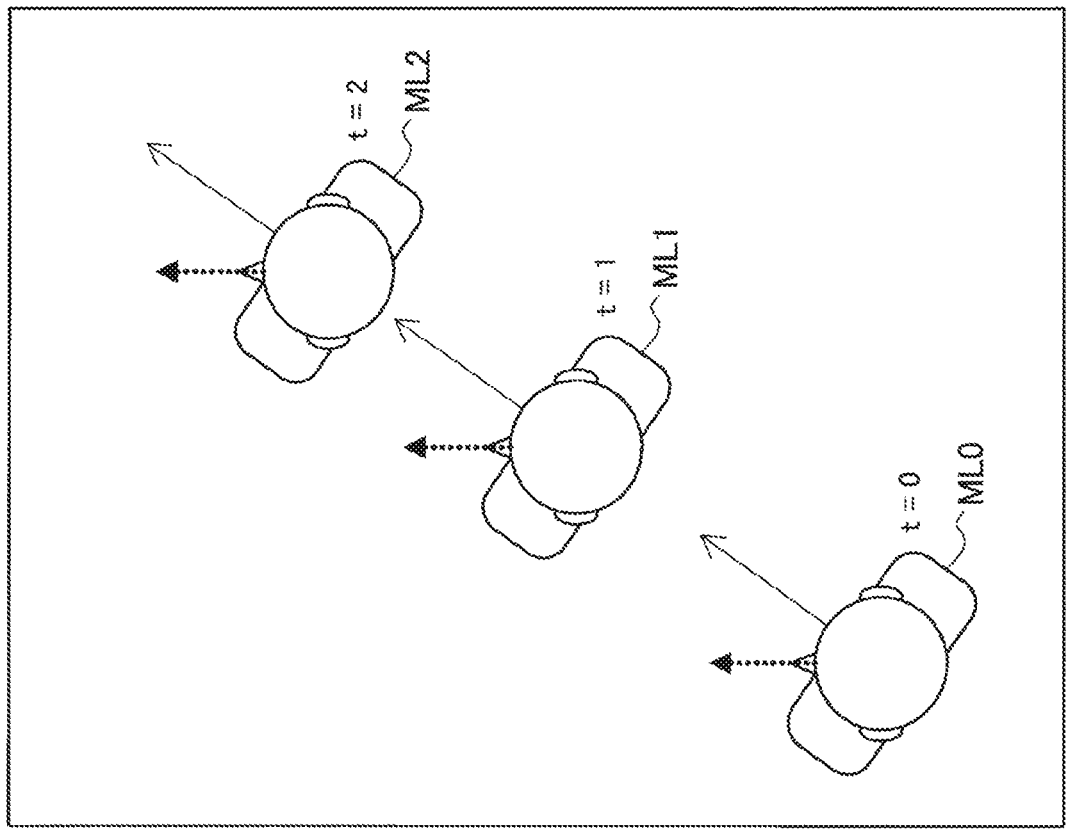
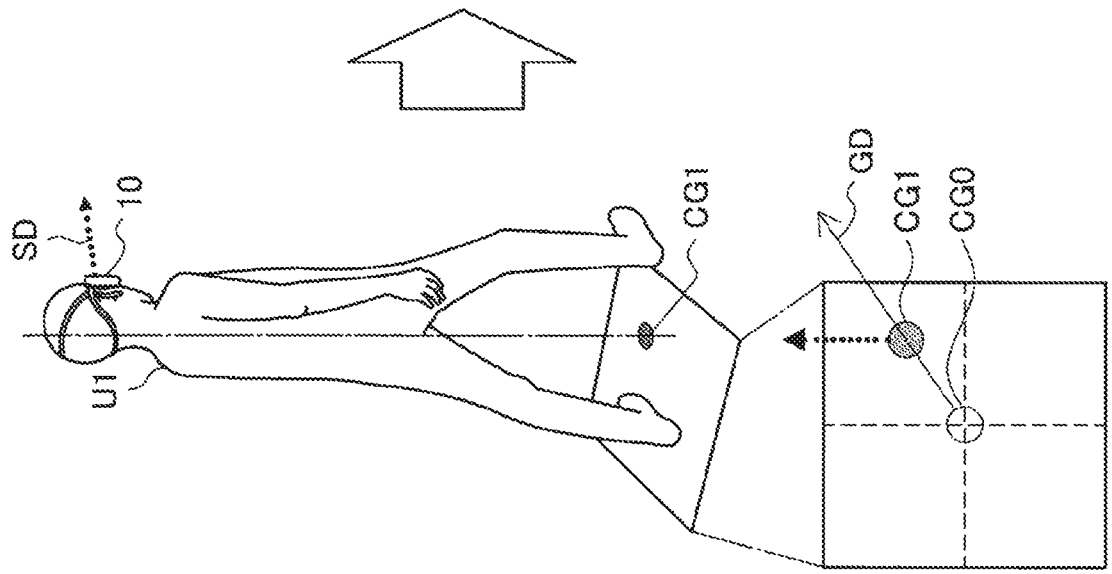

FIG.12
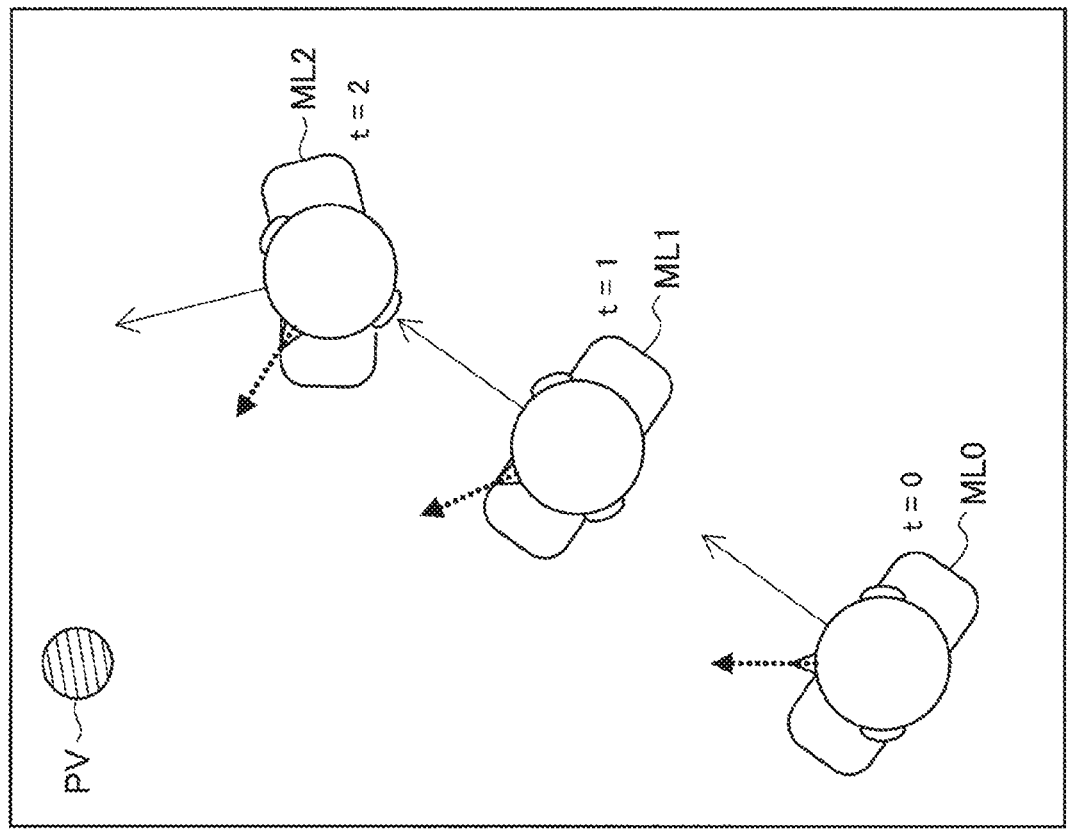
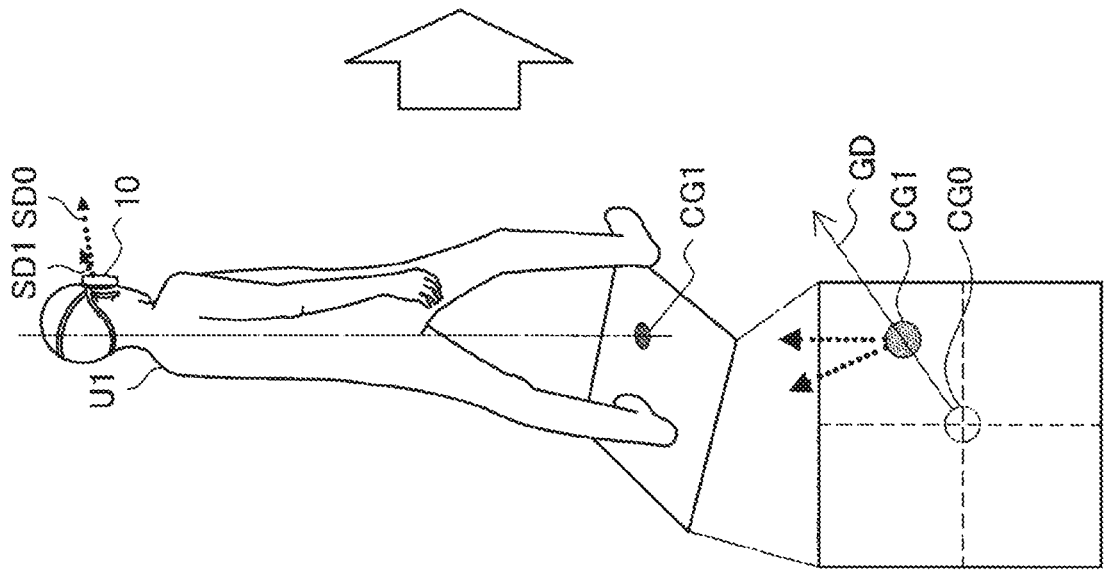

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/020896 filed on May 31, 2018, which claims priority benefit of Japanese Patent Application No. JP 2017-164045 filed in the Japan Patent Office on Aug. 29, 2017. Each of the above-referenced applications is hereby incorporated herein by reference in its entirety.

FIELD

The present invention relates to an information processing apparatus, an information processing method, and a program.

BACKGROUND

In recent years, a head-mounted display that is mounted on a user's head and provides images to the user through a display disposed in front of the eyes has been widely used. In addition, many techniques have been developed for improving the immersive feeling of images displayed by the head-mounted display. For example, Patent Literature 1 discloses a technique for performing image display control on the basis of the degree of change in posture of the head-mounted display.

CITATION LIST

Patent Literature

Patent Literature 1: JP 2017-54201 A

SUMMARY

Technical Problem

However, in the technique described in Patent Literature 1, the line-of-sight direction is partially switched using a controller-type input device. For this reason, with the technique described in Patent Literature 1, there is a strong operational feeling with respect to the control of the line-of-sight direction, and it may be difficult to obtain a sufficient immersive feeling.

Therefore, the present disclosure proposes a new and improved information processing apparatus, information processing method, and program capable of more intuitively controlling a viewpoint related to a display image.

Solution to Problem

According to the present disclosure, an information processing apparatus is provided that includes: a line-of-sight information acquisition unit which acquires line-of-sight information related to a line-of-sight direction of a user; a movement information acquisition unit which acquires a center-of-gravity movement information related to a center-of-gravity movement direction of a body of the user; and a display control unit which performs a first display control for controlling a display device to provide the user with a visual field image according to an imaging posture of an imaging unit by moving a viewpoint of the imaging unit in the center-of-gravity movement direction while substantially maintaining the imaging posture of the imaging unit when the line-of-sight direction and the center-of-gravity movement direction are substantially parallel and performs a second display control for controlling the display device to provide the user with the visual field image by rotating the imaging posture of the imaging unit and moving the viewpoint of the imaging unit in the center-of-gravity movement direction when the line-of-sight direction and the center-of-gravity movement direction are not substantially parallel.

Moreover, according to the present disclosure, an information processing method performed by a processor, the method is provided that includes: acquiring line-of-sight information related to a line-of-sight direction of a user; acquiring a center-of-gravity movement information related to a center-of-gravity movement direction of a body of the user; and performing a first display control for controlling a display device to provide the user with a visual field image according to an imaging posture of an imaging unit by moving a viewpoint of the imaging unit in the center-of-gravity movement direction while substantially maintaining the imaging posture of the imaging unit when the line-of-sight direction and the center-of-gravity movement direction are substantially parallel and performing a second display control for controlling the display device to provide the user with the visual field image by rotating the imaging posture of the imaging unit and moving the viewpoint of the imaging unit in the center-of-gravity movement direction when the line-of-sight direction and the center-of-gravity movement direction are not substantially parallel.

Moreover, according to the present disclosure, a program is provided that causes a computer to function as an information processing apparatus, wherein the information processing apparatus includes a line-of-sight information acquisition unit which acquires line-of-sight information related to a line-of-sight direction of a user, a movement information acquisition unit which acquires a center-of-gravity movement information related to a center-of-gravity movement direction of a body of the user, and a display control unit which performs a first display control for controlling a display device to provide the user with a visual field image according to an imaging posture of an imaging unit by moving a viewpoint of the imaging unit in the center-of-gravity movement direction while substantially maintaining the imaging posture of the imaging unit when the line-of-sight direction and the center-of-gravity movement direction are substantially parallel and performs a second display control for controlling the display device to provide the user with the visual field image by rotating the imaging posture of the imaging unit and moving the viewpoint of the imaging unit in the center-of-gravity movement direction when the line-of-sight direction and the center-of-gravity movement direction are not substantially parallel.

Advantageous Effects of Invention

As described above, according to the present disclosure, it is possible to more intuitively control the viewpoint related to the display image.

Incidentally, the above effects are not necessarily limited, and any of the effects described in this specification or other effects that can be grasped from this specification may be exhibited in addition to or in place of the above effects.

BRIEF DESCRIPTION OF DRAWINGS

FIG. 1 is a diagram for describing an overview of a first embodiment of the present disclosure.

FIG. 9 is a view illustrating a trajectory of the wraparound movement in the second display control according to the embodiment.

FIG. 10 is a view for explaining the movement control of the viewpoint using time-series information in the line-of-sight direction according to the embodiment.

FIG. 11 is a view illustrating control in the case of linearly moving obliquely with respect to the line-of-sight direction according to the embodiment.

FIG. 12 is a diagram illustrating the curve movement of the viewpoint using the time-series information in the line-of-sight direction according to the embodiment.

DESCRIPTION OF EMBODIMENTS

Figure 2:
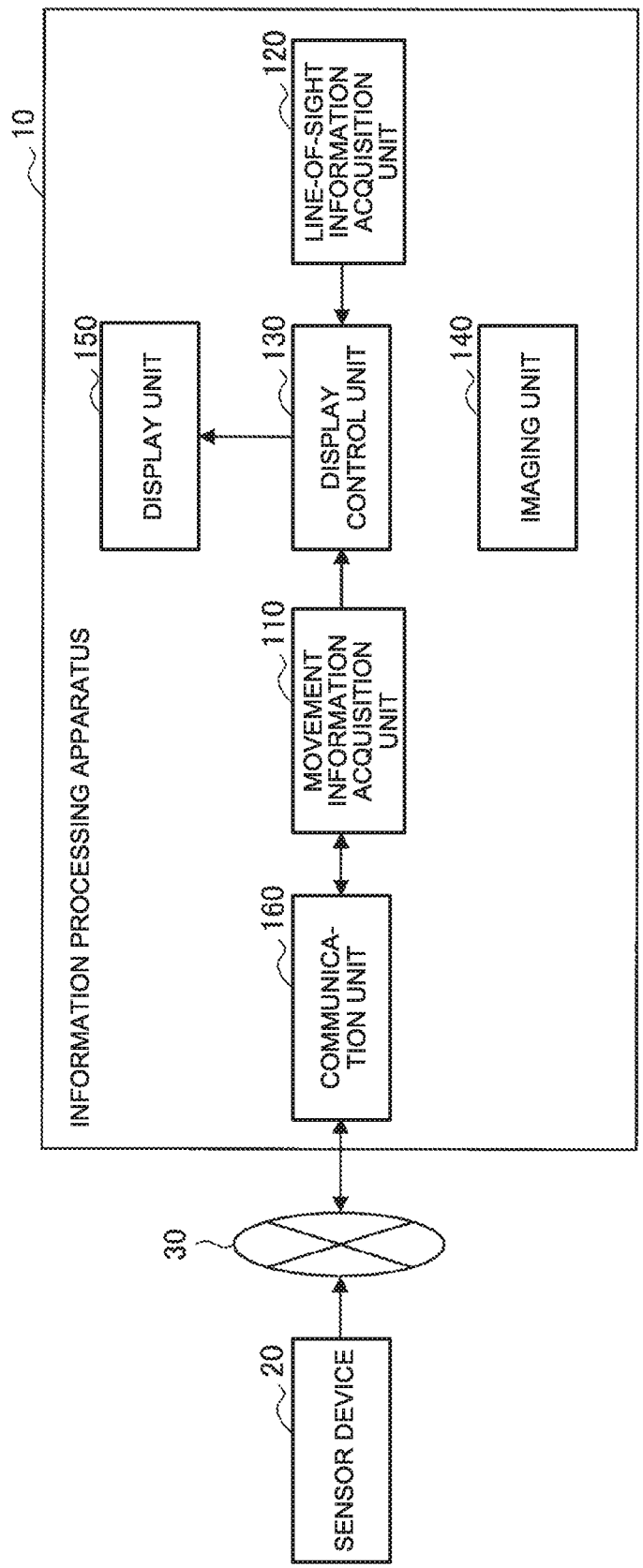
FIG. 2 is a block diagram illustrating a system configuration example and a functional configuration example of the information processing apparatus according to the embodiment.

Hereinafter, preferred embodiments of the present disclosure will be described in detail with reference to the accompanying drawings. Incidentally, in this specification and drawings, the components having substantially the same functional configuration are denoted by the same reference numerals, and redundant description is omitted.

Incidentally, the description will be given in the following order.

1. First Embodiment
1.1. Overview
1.2. Functional configuration
1.3. Details of viewpoint movement control
1.4. Control flow
2. Second Embodiment
2.1. Overview
2.2. Details concerning correction of movement vector
2.3. Control flow
3. Hardware configuration example
4. Summary

1. First Embodiment

<<1.1. Overview>>

As described above, in recent years, head-mounted displays have become widespread. The head-mounted display can display, for example, an image in a virtual space corresponding to a direction in which the user's head faces on a display unit disposed in front of the user's eyes. According to the above function of the head-mounted display, the user can operate the viewpoint in the virtual space by moving the head and enjoy images corresponding to various directions in the space.

In recent years, there is also an apparatus having a function of controlling movement in the virtual space and a change in viewpoint associated with the movement. The apparatus as described above, for example, moves the viewpoint in the virtual space forward, backward, left and right on the basis of the operation of the controller by the user, and provides a series of images that change with the movement. However, the movement control requiring the operation of the input device as described above restrains the user's hands and has a strong operational feeling, which causes a reduction in immersive feeling.

For example, a method of specifying the movement direction by a gesture using a hand also has been developed. However, due to the ambiguity related to the gesture recognition accuracy and the direction instruction, it may be difficult to accurately move in the direction intended by the user.

The technical idea according to the present disclosure has been conceived by paying attention to the above points, and makes it possible to more intuitively realize the control of the viewpoint related to the display image. For this reason, an information processing apparatus, an information processing method, and a program according to an embodiment of the present disclosure has one of the features that the viewpoint related to the visual field image provided by the head-mounted display is controlled on the basis of the action of the user accompanied by the movement of the center of gravity and the direction of the line of sight of the user.

FIG. 1 is a diagram for describing an overview of a first embodiment of the present disclosure. FIG. 1 illustrates a user U1 wearing the head-mounted display type information processing apparatus 10 according to this embodiment, and a visual field image FV displayed by the information processing apparatus 10.

In the situation illustrated in the upper part of FIG. 1, on the basis of a line-of-sight direction SD of the user detected in a state where the center of gravity of the user is located at CG0, the information processing apparatus 10 displays the visual field image FV in the virtual space corresponding to the line-of-sight direction SD on the display unit disposed in front of the user U1. Further, the visual field image FV illustrated in the upper part of FIG. 1 illustrates a gaze target object TO at which the user U1 is gazing and a gaze point PV of the user U1 on the gaze target object TO.

Here, it is assumed that the center of gravity of the user U1 moves forward from the state illustrated in the upper part of FIG. 1 to the state illustrated in the lower part of FIG. 1, that is, the center of gravity of the user U1 moves from CG0 to CG1. At this time, on the basis of the fact that the movement direction GD of the center of gravity of the body of the user U1 (hereinafter referred to as the center-of-gravity movement direction) and the line-of-sight direction SD of the user U1 are substantially parallel, the information processing apparatus 10 according to this embodiment determines that the user U1 wants to move forward and moves the viewpoint of the virtual camera (imaging unit) that generates the visual field image FV straight forward in the virtual space.

With reference to the visual field image FV illustrated in the lower part of FIG. 1, the gaze target object TO is closer to the front of the image than the visual field image FV illustrated in the upper part, and thus it can be confirmed that the viewpoint of the virtual camera has moved forward in the virtual space.

As described above, the information processing apparatus 10 that implements the information processing method according to this embodiment can control the movement of the imaging unit that generates a visual field image on the basis of the line-of-sight direction of the user and the center-of-gravity movement direction. According to the above-described function of the information processing apparatus 10 according to this embodiment, the user can more intuitively control the movement of the viewpoint related to the visual field image, and a sufficient immersive feeling can be obtained.

Incidentally, FIG. 1 illustrates an example in which the information processing apparatus 10 according to this embodiment linearly moves the imaging unit that generates a visual field image in the center-of-gravity movement direction, that is, forward on the basis of the line-of-sight direction of the user and the center-of-gravity movement direction. However, the movement control of the viewpoint according to this embodiment is not limited to this example. For example, on the basis of the line-of-sight direction of the user and the center-of-gravity movement direction, the information processing apparatus 10 according to this embodiment can perform control such that the viewpoint moves while turning in the direction of the gaze point or control such that the viewpoint moves to turn around the gaze point.

Hereinafter, the configuration and characteristics of the information processing apparatus 10 that implements the above functions will be described in detail.

<<1.2. Functional Configuration>>

First, a system configuration example according to this embodiment will be described. FIG. 2 is a block diagram illustrating a system configuration example and a functional configuration example of the information processing apparatus 10 according to this embodiment. Referring to FIG. 2, the information processing system according to this embodiment includes the information processing apparatus 10 and a sensor device 20. Further, the information processing apparatus 10 and the sensor device 20 are connected via a network 30 so as to communicate with each other.

(Information Processing Apparatus 10)

The information processing apparatus 10 according to this embodiment has a function of controlling the movement of the viewpoint related to the visual field image on the basis of the line-of-sight direction of the user and the center-of-gravity movement direction. The information processing apparatus 10 according to this embodiment may acquire the center-of-gravity movement direction on the basis of the sensor information received from the sensor device 20 via the network 30.

Further, as described above, the information processing apparatus 10 according to this embodiment may be realized as a head-mounted display. Details of the functions of the information processing apparatus 10 according to this embodiment will be described separately in detail.

(Sensor Device 20)

The sensor device 20 according to this embodiment is a device that collects sensor information related to movement of the user's center of gravity. The sensor device 20 transmits the collected sensor information to the information processing apparatus 10 via the network 30. The sensor device 20 according to this embodiment may be, for example, a mat type device including a pressure sensor. In this case, the sensor device 20 can transmit information on the pressure value that has changed with the movement of the center of gravity of the user on the device to the information processing apparatus 10.

The sensor device 20 according to this embodiment may be a device having an imaging function. In this case, the information processing apparatus 10 can estimate the center-of-gravity movement direction of the user on the basis of a group of images illustrating the user's body imaged by the sensor device 20. Further, in this case, the information processing apparatus 10 can accurately estimate the center-of-gravity movement direction by transmitting user images captured from a plurality of different angles by the sensor device 20.

The sensor device 20 according to this embodiment may include an infrared sensor that detects infrared rays irradiated or reflected by an infrared marker worn by the user. In this case, the information processing apparatus 10 can acquire the center-of-gravity movement direction of the user on the basis of the position change of the infrared marker detected by the sensor device 20.

The sensor device 20 according to this embodiment may be a device which includes an acceleration sensor, a gyro sensor, a geomagnetic sensor, and the like and is worn by the user. In this case, the information processing apparatus 10 can also estimate the center-of-gravity movement direction of the user on the basis of information such as acceleration, an angular velocity, and a direction collected by the sensor device 20.

(Network 30)

The network 30 has a function of connecting the information processing apparatus 10 and the sensor device 20. The network 30 may include a public line network such as the Internet, a telephone line network, a satellite communication network, various local area networks (LAN) including Ethernet (registered trademark), a wide area network (WAN), and the like. In addition, the network 30 may include a dedicated line network such as an Internet protocol-virtual private network (IP-VPN). In addition, the network 30 may include a wireless communication network such as Wi-Fi (registered trademark) or Bluetooth (registered trademark).

Hereinbefore, the configuration example of the information processing system according to this embodiment has been described. Incidentally, the above-described configuration described with reference to FIG. 2 is merely an example, and the configuration of the information processing system according to this embodiment is not limited to the example. For example, as will be described later, the information processing system according to this embodiment may include a control target device that moves on the basis of the control by the information processing apparatus 10. The configuration of the information processing system according to this embodiment can be flexibly modified according to specifications and operations.

Subsequently, an example of a functional configuration of the information processing apparatus 10 according to this embodiment will be described with reference to FIG. 2. Referring to FIG. 2, the information processing apparatus 10 according to this embodiment includes a movement information acquisition unit 110, a line-of-sight information acquisition unit 120, a display control unit 130, an imaging unit 140, a display unit 150, and a communication unit 160.

(Movement Information Acquisition Unit 110)

The movement information acquisition unit 110 according to this embodiment has a function of acquiring center-of-gravity movement information regarding the center-of-gravity movement direction of the user's body. The movement information acquisition unit 110 according to this embodiment can acquire the center-of-gravity movement direction on the basis of the sensor information collected by the sensor device 20. The movement information acquisition unit 110 according to this embodiment can acquire the center-of-gravity movement direction on the basis of, for example, pressure information, image information, marker position information, acceleration information, angular velocity information, direction information, and the like.

(Line-of-Sight Information Acquisition Unit 120)

The line-of-sight information acquisition unit 120 according to this embodiment has a function of acquiring line-of-sight information related to the line-of-sight direction of the user. The line-of-sight information acquisition unit 120 according to this embodiment may acquire the line-of-sight information of the user using, for example, a corneal reflection method. Here, the corneal reflection method is a method of estimating the line-of-sight direction by irradiating light from a light source to the user's eyeball and detecting the reflected light of the light on the corneal surface and the position of the pupil. Therefore, the line-of-sight information acquisition unit 120 according to this embodiment may include a light source that irradiates light to the user's eyeball and an imaging sensor that detects reflected light from the corneal surface.

The line-of-sight information acquisition unit 120 according to this embodiment may estimate the front direction of the information processing apparatus 10 as the line-of-sight direction of the user. Therefore, the line-of-sight information acquisition unit 120 according to this embodiment may include a gyro sensor or a geomagnetic sensor for detecting a change in the front direction of the information processing apparatus 10.

(Display Control Unit 130)

The display control unit 130 according to this embodiment has a function to control the movement of the viewpoint of the imaging unit 140 that provides the visual field image on the basis of the line-of-sight information acquired by the line-of-sight information acquisition unit 120 and the line-of-sight information acquired by the movement information acquisition unit 110. At this time, the display control unit 130 according to this embodiment controls the movement of the viewpoint on the basis of the angle difference between the line-of-sight direction and the center-of-gravity movement direction.

Specifically, when the line-of-sight direction and the center-of-gravity movement direction are substantially parallel, the display control unit 130 according to this embodiment performs a first display control to control the display unit 150 so as to provide the user with the visual field image corresponding to the imaging posture of the imaging unit 140 by moving the viewpoint of the imaging unit 140 in the center-of-gravity movement direction while substantially maintaining the imaging posture of the imaging unit 140.

That is, when the line-of-sight direction and the center-of-gravity movement direction are almost the same direction, the display control unit 130 according to this embodiment determines that the user wants to move in the direction and moves the viewpoint of the imaging unit 140 straight in the important direction while maintaining the imaging posture. Incidentally, the above-described imaging posture may be a posture defined by a rotation axis (roll axis, pitch axis, yaw axis) having three degrees of freedom.

According to the above function of the display control unit 130 according to this embodiment, compared to the case of controlling the movement of the viewpoint using only the line-of-sight direction or the direction estimated from the gesture, an effect is expected in which the movement direction desired by the user is detected with high accuracy.

When the line-of-sight direction and the center-of-gravity movement direction are not substantially parallel, the display control unit 130 according to this embodiment performs a second display control to control the display unit 150 so as to provide a visual field image to the user by rotating the imaging posture of the imaging unit 140 and moving the viewpoint of the imaging unit 140 in the center-of-gravity movement direction.

That is, when the line-of-sight direction and the center-of-gravity movement direction are in different directions, the display control unit 130 according to this embodiment determines that the user wants to change the direction from the current movement direction to the line-of-sight direction and moves the viewpoint of the imaging unit 140 so as to draw a curve in the center-of-gravity movement direction while rotating the imaging posture of the imaging unit 140 in the line-of-sight direction.

According to the above-described function of the display control unit 130 according to this embodiment, it is possible to perform movement control of a viewpoint with a high degree of freedom that is not limited to straight advancement or backward movement. Further, according to the above function, even when the movement direction of the viewpoint intended by the user is different from the center-of-gravity movement direction, the movement direction of the viewpoint can be corrected by the line-of-sight direction, and the movement control of the viewpoint can be realized more intuitively and accurately.

Incidentally, details of the functions of the display control unit 130 according to this embodiment will be described in detail with specific examples.

(Imaging Unit 140)

The imaging unit 140 according to this embodiment has a function of changing the imaging posture and the viewpoint on the basis of the control by the display control unit 130 and obtaining the visual field image corresponding to the imaging posture and the viewpoint. The imaging unit 140 according to this embodiment may be a virtual camera that generates a visual field image corresponding to an arbitrary viewpoint direction in the virtual space, for example. That is, the display control unit 130 according to this embodiment can control the imaging posture and viewpoint of the virtual camera, and cause the display unit 150 to display the visual field image corresponding to the imaging posture and viewpoint.

The imaging unit 140 according to this embodiment may be a real camera provided in an unmanned moving body such as an unmanned aerial vehicle (UAV) or various robots in real space. That is, the display control unit 130 according to this embodiment can control the imaging posture and viewpoint of the real camera, and can cause the display unit 150 to display the visual field image corresponding to the imaging posture and viewpoint.

Incidentally, the degree of freedom related to the translation of the viewpoint of the imaging unit 140 according to this embodiment may vary depending on the characteristics of the imaging unit 140. For example, when the imaging unit 140 is a virtual camera that reproduces the viewpoint of a person, a car, or the like on the ground surface, or when the imaging unit 140 is an unmanned moving body that moves in contact with the ground surface, the imaging unit 140 may have a translation axis with two degrees of freedom (x-axis, y-axis).

On the other hand, when the imaging unit 140 is a virtual camera that reproduces a viewpoint of a bird, a fish, or the like, or when the imaging unit 140 is an unmanned moving body in the air or underwater, the imaging unit 140 may have a translation axis with three degrees of freedom (x axis, y axis, z-axis).

(Display Unit 150)

The display unit 150 according to this embodiment has a function of presenting a visual field image to the user on the basis of the control by the display control unit 130. The display unit 150 according to this embodiment may be regarded as an example of the display device according to the present disclosure. The display unit 150 according to this embodiment is disposed in front of the user's eyes, and has, for example, two display areas corresponding to the user's right eye and left eye. The display areas are realized by, for example, a liquid crystal display or an organic EL display.

(Communication Unit 160)

The communication unit 160 according to this embodiment has a function of performing information communication with the sensor device 20 via the network 30. Specifically, the communication unit 160 receives various sensor information from the sensor device 20. Further, the communication unit 160 according to this embodiment may perform information communication with the control target device described above. Here, the control target device may be an unmanned moving body including a real camera that is controlled by the display control unit 130. In this case, the communication unit 160 transmits a control signal related to the viewpoint control generated by the display control unit 130 to the control target device.

Hereinbefore, the functional configuration of the information processing apparatus 10 according to this embodiment has been described. Incidentally, the above-described configuration described with reference to FIG. 2 is merely an example, and the functional configuration of the information processing apparatus 10 according to this embodiment is not limited to the example. For example, the information processing apparatus 10 according to this embodiment may be a server provided separately from the head-mounted display. In this case, the information processing apparatus 10 can display the visual field image on the display unit of the head-mounted display by controlling the head-mounted display worn by the user via the network 30. The functional configuration of the information processing apparatus 10 according to this embodiment can be flexibly changed according to specifications and operations.

<<1.3 Details of Viewpoint Movement Control>>

Next, the movement control of the viewpoint of the imaging unit 140 by the display control unit 130 according to this embodiment will be described in detail. As described above, the display control unit 130 according to this embodiment can control the viewpoint and the imaging posture of the imaging unit 140 that acquires the visual field image on the basis of the line-of-sight direction of the user and the center-of-gravity movement direction.

At this time, the display control unit 130 according to this embodiment can realize a plurality of types of viewpoint movements with different trajectories on the basis of the angle difference between the line-of-sight direction and the center-of-gravity movement direction.

First, the first display control according to this embodiment will be described. One feature of the first display control according to this embodiment is that the viewpoint of the imaging unit 140 is moved in the center-of-gravity movement direction while substantially maintaining the imaging posture of the imaging unit 140. The display control unit 130 according to this embodiment performs the first display control when the line-of-sight direction and the center-of-gravity movement direction are substantially parallel.

Figure 3:
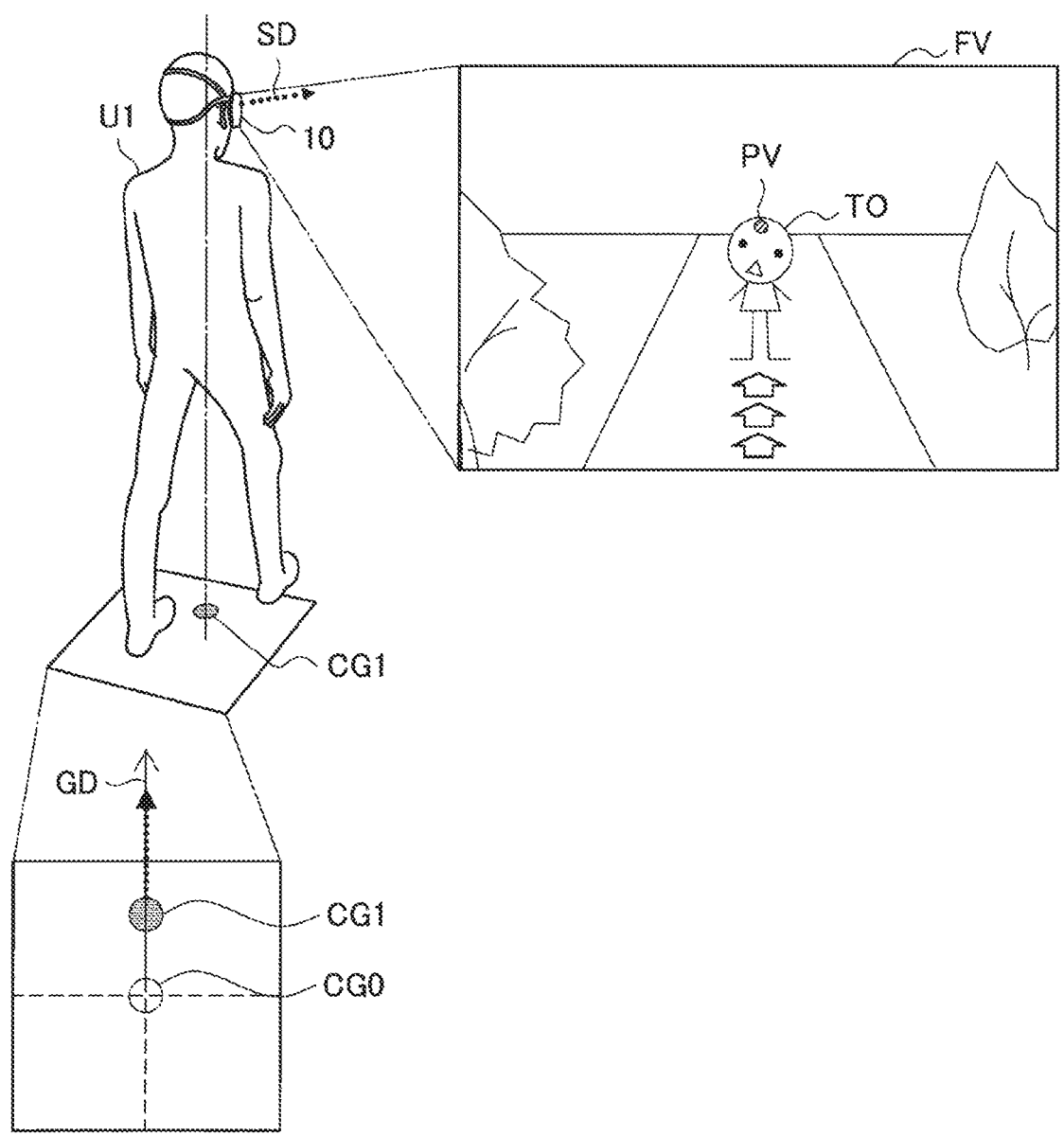
FIG. 3 is a view for explaining a first display control according to the embodiment.

FIG. 3 is a view for explaining the first display control according to this embodiment. The left side of FIG. 3 illustrates the user U1 wearing the information processing apparatus 10, the line-of-sight direction SD of the user U1 is indicated by a dotted arrow, and the center-of-gravity movement direction GD moving from CG0 to CG1 is indicated by a solid arrow.

At this time, the display control unit 130 according to this embodiment moves the viewpoint straight in the center-of-gravity movement direction GD while substantially maintaining the imaging posture of the imaging unit 140 on the basis of the fact that the line-of-sight direction SD and the center-of-gravity movement direction GD are substantially parallel. Specifically, when the angle difference θ between the line-of-sight direction SD and the center-of-gravity movement direction GD is less than a first threshold value (for example, 5°), the display control unit 130 may execute the straight movement control described above. In the visual field image FV on the right side of FIG. 3, the trajectory of the viewpoint of the imaging unit 140 based on the above-described movement control is schematically indicated by a white arrow.

Figure 4:
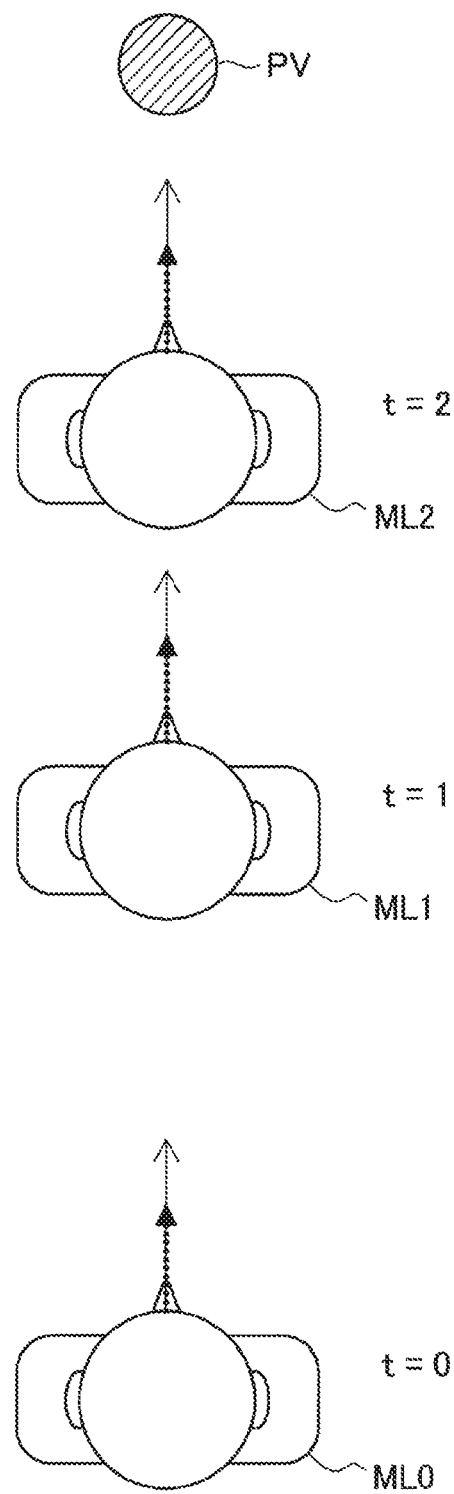
FIG. 4 is a view for explaining a trajectory related to a straight movement of a viewpoint according to the embodiment in detail.

Next, the trajectory related to the straight movement of the viewpoint will be described in detail with reference to FIG. 4. FIG. 4 is a view illustrating a trajectory of a straight movement in the first display control according to this embodiment. In FIG. 4, the viewpoint and imaging posture of the imaging unit 140 at time t=0 to 2 are represented by person models ML0 to ML2. Here, the positions of the person models ML0 to ML2 in the drawing represent the position of the viewpoint of the imaging unit 140 in the virtual space. In addition, the front direction of the person models ML0 to ML2 represents the horizontal imaging posture of the imaging unit 140. Further, the head direction in the person models ML0 to ML2 represents the line-of-sight direction SD of the user. Incidentally, in FIG. 4, the center-of-gravity movement direction GD of the user is represented by a solid arrow as in FIG. 3.

As illustrated in the drawing, when the line-of-sight direction SD of the user toward the gaze point PV and the center-of-gravity movement direction GD are substantially parallel at the time t=0, the display control unit 130 moves the viewpoint of the imaging unit 140 in the center-of-gravity movement direction GD while substantially maintaining the imaging posture. Similarly, when the line-of-sight direction SD of the user toward the gaze point PV and the center-of-gravity movement direction GD are substantially parallel at the time t=1 after the movement, the display control unit 130 moves the viewpoint of the imaging unit 140 in the center-of-gravity movement direction GD while substantially maintaining the imaging posture.

According to the above control by the display control unit 130, the trajectory related to the movement of the viewpoint of the imaging unit 140 is a straight line as in the person models ML0 to ML2 illustrated in the drawing. In this way, when the line-of-sight direction SD of the user and the center-of-gravity movement direction GD are substantially parallel, the display control unit 130 according to this embodiment can cause the display unit 150 to display the visual field images sequentially acquired in a straight-ahead direction by moving straight the line of sight of the imaging unit 140.

Incidentally, when the display control unit 130 detects from the line-of-sight information that the depth of the gaze point PV of the user does not change, the display control unit 130 can perform control so that the movement amount of the straight movement decreases as the gaze point PV is approached as illustrated in the drawing. According to the above function of the display control unit 130, the user can intuitively control the straight movement and stop of the viewpoint by the line of sight and the center of gravity.

Next, the second display control according to this embodiment will be described. One feature of the second display control according to this embodiment is that the imaging posture of the imaging unit 140 is rotated, and the viewpoint of the imaging unit 140 is moved in the center-of-gravity movement direction. The display control unit 130 according to this embodiment performs the second display control when the line-of-sight direction and the center-of-gravity movement direction are not substantially parallel, that is, when the angle difference θ between the line-of-sight direction and the center-of-gravity movement direction exceeds the first threshold value.

At this time, on the basis of the line-of-sight direction of the user, the display control unit 130 according to this embodiment determines the direction in which the imaging posture of the imaging unit 140 is rotated. More specifically, the display control unit 130 may rotate the imaging posture of the imaging unit 140 so that the image center of the visual field image acquired by the imaging unit 140 approaches the line-of-sight direction of the user. According to the function of the display control unit 130, a more natural visual field image corresponding to a change in the line-of-sight direction of the user can be acquired dynamically.

One feature of the display control unit 130 according to this embodiment is, in the second display control, to determine the rotation amount of rotating the imaging posture of the imaging unit 140 on the basis of the magnitude of the angle difference θ between the line-of-sight direction and the center-of-gravity movement direction. At this time, when the angle difference θ is less than the determination value and when the angle difference θ is greater than or equal to the determination value, the display control unit 130 according to this embodiment determines the rotation amount using different calculation methods and moves the viewpoint of the imaging unit 140 by the movement amount corresponding to the rotation amount in the center-of-gravity movement direction. According to the function of the display control unit 130 according to this embodiment, it is possible to realize two types of curve movements having different trajectories.

Here, the curve movement includes a curve movement and a wraparound movement. First, a curve movement according to this embodiment will be described.

Figure 5:
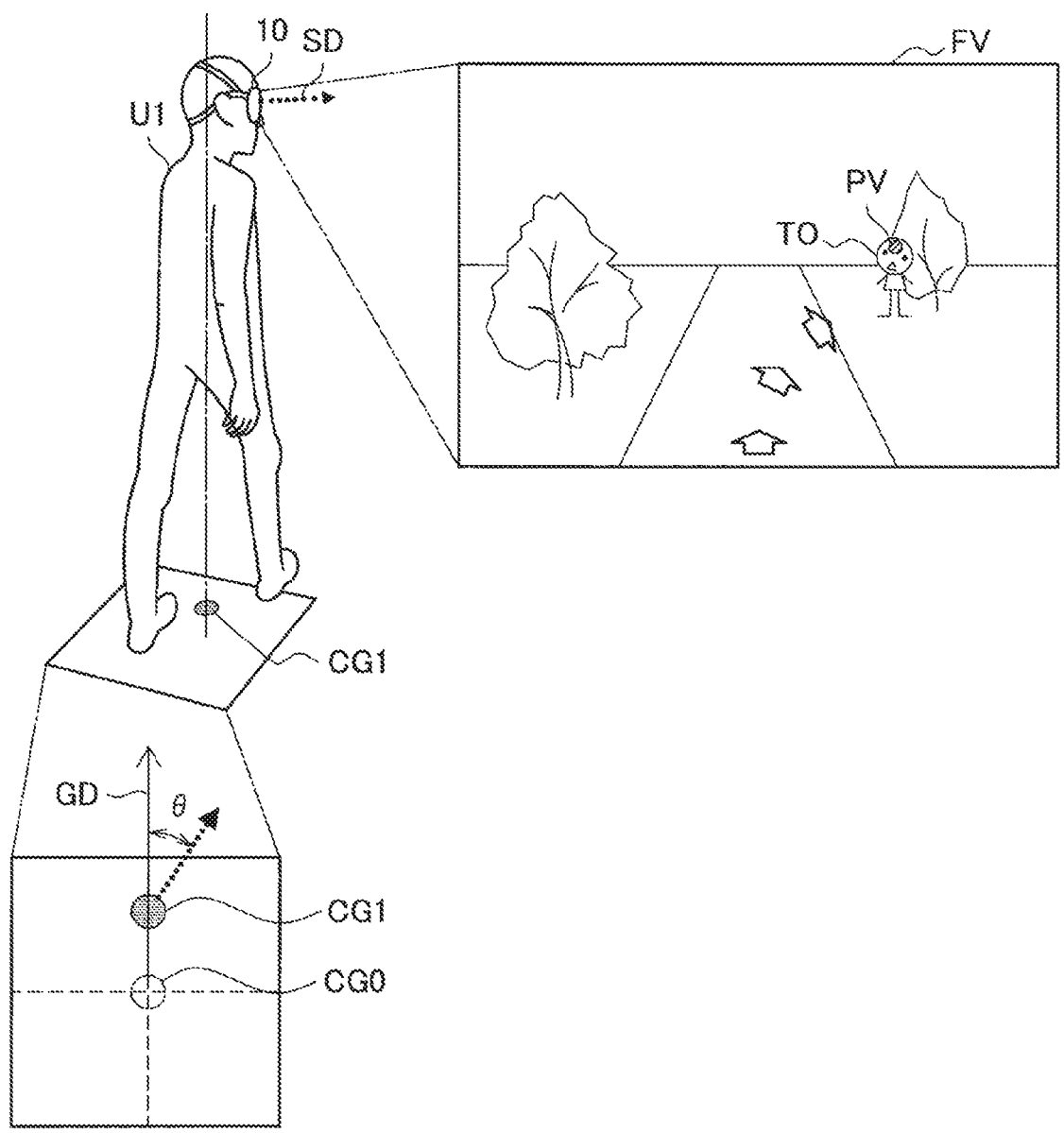
FIG. 5 is a view for explaining a curve movement in a second display control according to the embodiment.

FIG. 5 is a view for explaining a curve movement in the second display control according to this embodiment. On the left side of FIG. 5, as in FIG. 3, the line-of-sight direction SD of the user U1 is indicated by a dotted arrow, and the center-of-gravity movement direction GD moving from CG0 to CG1 is indicated by a solid arrow. On the other hand, in the example illustrated in FIG. 5, unlike the case of FIG. 3, the line-of-sight direction SD of the user U1 and the center-of-gravity movement direction GD are not substantially parallel. At this time, the display control unit 130 according to this embodiment determines a calculation method related to the rotation of the imaging posture on the basis of the angle difference θ between the line-of-sight direction SD and the center-of-gravity movement direction GD.

In the example illustrated in FIG. 5, the display control unit 130 performs movement control so that the viewpoint of the imaging unit 140 performs the curve movement on the basis of the fact that the angle difference θ is less than the determination value. In the visual field image FV on the right side of FIG. 5, the trajectory of the viewpoint of the imaging unit 140 based on the above movement control is schematically indicated by a white arrow.

Figure 6:
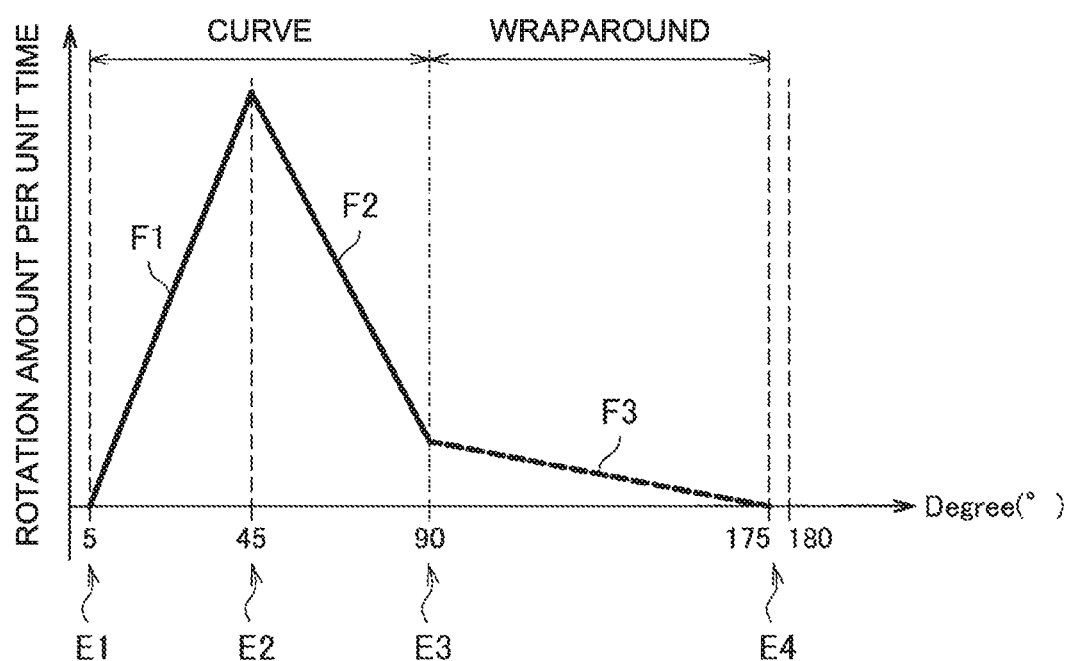
FIG. 6 is a diagram for explaining a calculation method used for calculation of a rotation amount according to the embodiment.

Here, a calculation method when the display control unit 130 determines the rotation amount on the basis of the angle difference θ will be described. FIG. 6 is a diagram for explaining a calculation method used for calculation of a rotation amount according to this embodiment. FIG. 6 is a graph illustrating three functions used when the display control unit 130 determines the rotation amount on the basis of the angle difference θ. Incidentally, a horizontal axis in FIG. 6 indicates the magnitude of the angle difference θ, and a vertical axis indicates the rotation amount per unit time.

For example, when the angle difference θ is equal to or greater than the first threshold value E1 and smaller than the third threshold value E3, the display control unit 130 determines the rotation amount using the first function F1 or the second function F2 and performs movement control so that the viewpoint of the imaging unit 140 performs the curve movement. That is, when the angle difference θ is less than the third threshold value E3 corresponding to the determination value, the display control unit 130 can determine the rotation amount so that the movement direction of the viewpoint of the imaging unit 140 curves toward the line-of-sight direction, and can rotate the imaging posture of the imaging unit 140 and move the viewpoint of the imaging unit 140 by the movement amount corresponding to the rotation amount in the center-of-gravity movement direction.

Incidentally, when performing control related to curve movement, the display control unit 130 realizes the curve movement of the viewpoint by properly using the first function F1 or the second function F2 on the basis of the magnitude of the angle difference θ.

Specifically, when the angle difference θ is less than the third threshold value E3 corresponding to the determination value, and the angle difference θ is less than the second threshold value E2 corresponding to a predetermined value, by using the first function F1, the display control unit 130 determines the rotation amount so that the degree of rotation decreases as the angle difference θ decreases. At this time, a rotation amount y calculated by the first function F1 may be defined by, for example, y=w1θ.

On the other hand, when the angle difference θ is less than the third threshold value E3 corresponding to the determination value, and the angle difference θ is equal to or larger than the second threshold value E2 corresponding to the predetermined value, by using the second function F2, the display control unit 130 determines the rotation amount so that the degree of rotation increases as the angle difference θ decreases. At this time, the rotation amount y calculated by the second function F2 may be defined by, for example, y=w2 (−θ)+b.

Figure 7:
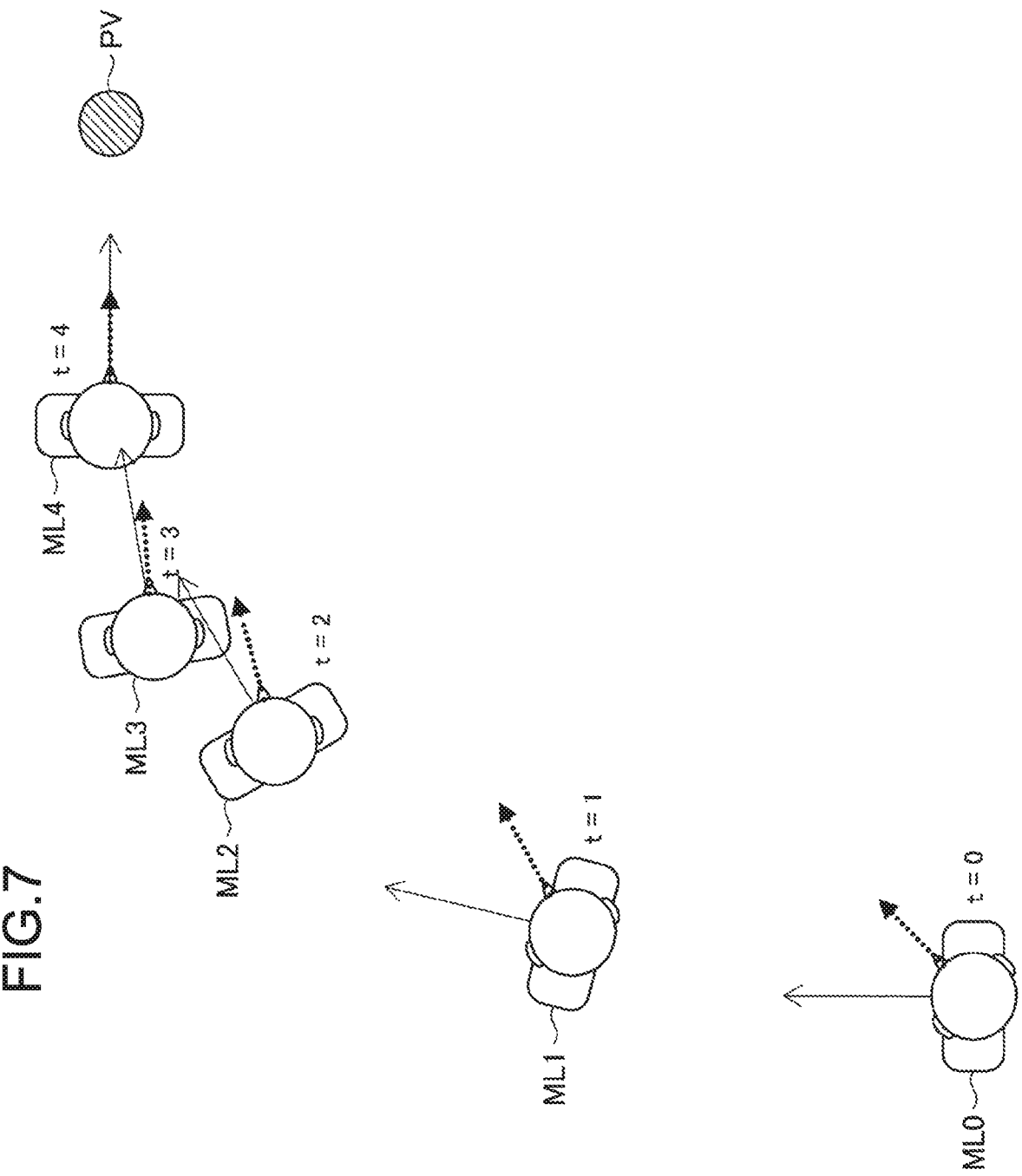
FIG. 7 is a view illustrating a trajectory of the curve movement in the second display control according to the embodiment.

FIG. 7 is a view illustrating a trajectory of the curve movement in the second display control according to this embodiment. FIG. 7 illustrates an example in which the display control unit 130 moves the viewpoint of the imaging unit 140 by a curve from a state where the angle difference θ is less than 45°. Incidentally, in FIG. 7, the viewpoint and imaging posture of the imaging unit 140 at t=0 to 3 are represented by person models ML0 to ML3.

As illustrated in the drawing, when the angle difference θ between the line-of-sight direction SD of the user toward the gaze point PV and the center-of-gravity movement direction GD is less than the second threshold value E2 (here, 45°) at time t=0, the display control unit 130 rotates the imaging posture of the imaging unit 140 so as to approach the line-of-sight direction SD by the rotation amount calculated using the first function F1, and moves the viewpoint of the imaging unit 140 by the movement amount according to the rotation amount.

Similarly, also at time t=1 to 3, the display control unit 130 rotates the imaging posture of the imaging unit 140 by the rotation amount calculated using the first function F1 on the basis of the fact that the angle difference θ is less than the second threshold value E2. Referring to the person models ML0 to ML3 corresponding to the times t=0 to 3, it can be seen that the degree of rotation amount of the imaging posture decreases as the angle difference θ decreases according to the first function F1.

On the other hand, at time t=4, since the angle difference θ between the line-of-sight direction SD of the user and the center-of-gravity movement direction GD is 0, similarly to the case illustrated in FIG. 4, the display control unit 130 moves the viewpoint of the imaging unit 140 straight while maintaining the imaging posture.

As described above, according to the display control unit 130 according to this embodiment, a trajectory can be realized such that the movement direction of the viewpoint approaches toward the gaze point PV of the user while curving.

Figure 8:
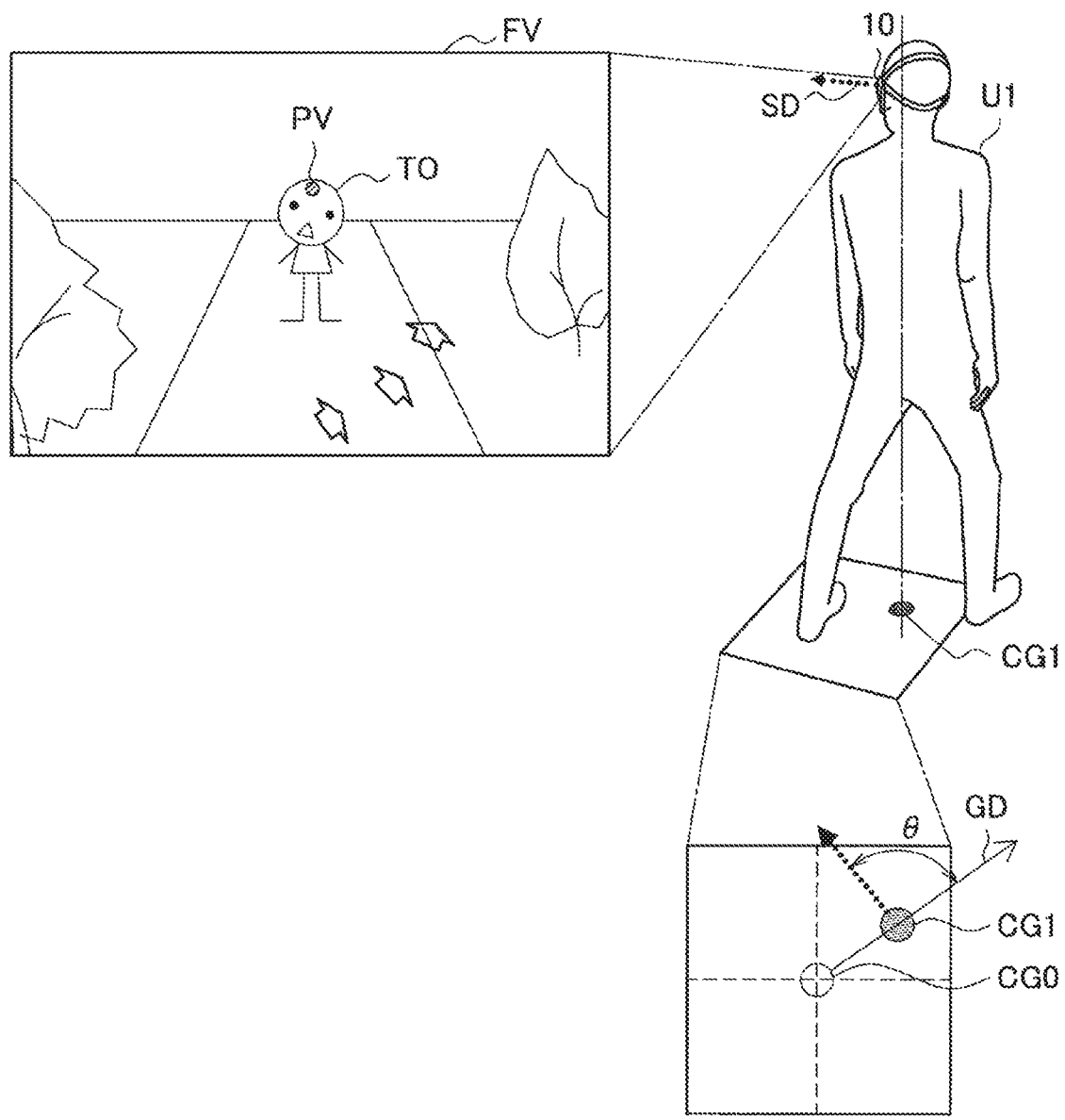
FIG. 8 is a view for explaining a wraparound movement in the second display control according to the embodiment.

Next, the wraparound movement according to this embodiment will be described. FIG. 8 is a view for explaining the wraparound movement in the second display control according to this embodiment. On the right side of FIG. 8, as in FIG. 5, the line-of-sight direction SD of the user U1 is indicated by a dotted arrow, and the center-of-gravity movement direction GD moving from CG0 to CG1 is indicated by a solid arrow. In addition, in the example illustrated in FIG. 8, the angle difference θ between the line-of-sight direction SD of the user U1 and the center-of-gravity movement direction GD is equal to or greater than the third threshold value E3 corresponding to the determination value. At this time, the display control unit 130 according to this embodiment may determine the rotation amount related to the imaging posture of the imaging unit 140 using the third function F3. In the visual field image FV on the left side of FIG. 8, the trajectory of the viewpoint of the imaging unit 140 based on the above movement control is schematically indicated by a white arrow.

Here, the third function F3 according to this embodiment will be described again with reference to FIG. 6. When the angle difference θ is equal to or larger than the third threshold value corresponding to the determination value and less than the fourth threshold value E4 (for example, 175°), the display control unit calculates the rotation amount using the third function F3 according to the graph illustrated in FIG. 6 and performs the movement control so that the viewpoint of the imaging unit 140 performs the wraparound movement. That is, when the line-of-sight direction and the center-of-gravity movement direction are not substantially parallel, and the angle difference θ is equal to or greater than the third threshold value E3 corresponding to the determination value, the display control unit 130 can determine the rotation amount such that the movement direction of the viewpoint of the imaging unit 140 wraps around toward the line-of-sight direction, and can rotate the imaging posture of the imaging unit 140 and move the viewpoint of the imaging unit by the movement amount corresponding to the rotation amount in the center-of-gravity movement direction.

At this time, the display control unit 130 according to this embodiment determines the rotation amount according to the third function F3 so that the degree of rotation increases as the angle difference θ decreases. However, the display control unit 130 determines the rotation amount related to the imaging posture so that the degree of change in the rotation amount is generally smaller than in the case of curve movement. At this time, the rotation amount y calculated by the third function F3 may be defined by, for example, y=w3 (−θ)+b.

FIG. 9 is a view illustrating a trajectory of the wraparound movement in the second display control according to this embodiment. FIG. 9 illustrates an example in which the display control unit 130 causes the viewpoint of the imaging unit 140 to wrap around from a state where the angle difference θ=120°. Incidentally, in FIG. 9, the viewpoint and imaging posture of the imaging unit 140 at t=0 to 3 are represented by person models ML0 to ML3.

As illustrated in the drawing, when the angle difference θ between the line-of-sight direction SD of the user toward the gaze point PV and the center-of-gravity movement direction GD is equal to or greater than the third threshold value E3 (here, 90°) at time t=0, the display control unit 130 rotates the imaging posture of the imaging unit 140 so as to approach the line-of-sight direction SD by the rotation amount calculated using the third function F3, and moves the viewpoint of the imaging unit 140 by the movement amount according to the rotation amount.

Similarly, also at time t=1 to 3, the display control unit 130 rotates the imaging posture of the imaging unit 140 by the rotation amount calculated using the third function F3 on the basis of the fact that the angle difference θ is equal to or greater than the third threshold value E3. Referring to the person models ML0 to ML3 corresponding to the times t=0 to 3, it can be seen that the degree of rotation amount of the imaging posture increases as the angle difference θ decreases according to the third function F3.

As described above, according to the display control unit 130 according to this embodiment, a trajectory can be realized such that the movement direction of the viewpoint approaches toward the gaze point PV of the user while wrapping around.

Hereinbefore, the actions of the first display control and the second display control according to this embodiment have been described. According to the first display control and the second display control according to this embodiment, on the basis of the angle difference between the line-of-sight direction of the user and the center-of-gravity movement direction, straight movement, curve, and wrap-around movement can be used properly, and the user can be provided with a visual field image with a more natural viewpoint change.

On the other hand, in the viewpoint movement control described so far, it is possible to move the viewpoint of the imaging unit 140 straight only when the line-of-sight direction and the center-of-gravity movement direction are substantially parallel. However, depending on the situation, there may be a case where it is desired to move straight in a direction different from the line-of-sight direction.

For example, when the imaging unit 140 is a virtual camera that reproduces a viewpoint of a hoverboard or the like that can move straight in all directions on a horizontal plane, a situation is also considered in which the viewpoint of the imaging unit 140 is moved straight in an oblique direction while keeping the line of sight toward the front.

The display control unit 130 according to this embodiment can realize the straight movement in the oblique direction as described above by using the time-series information in the line-of-sight direction for the determination of the movement direction of the viewpoint.

FIG. 10 is a view for explaining the movement control of the viewpoint using time-series information in the line-of-sight direction according to this embodiment. On the left side of FIG. 10, the line-of-sight direction SD of the user U1 is indicated by a dotted arrow, and the center-of-gravity movement direction GD moving from CG0 to CG1 is indicated by a solid arrow. In the example illustrated in FIG. 10, the line-of-sight direction SD and the center-of-gravity movement direction GD are substantially parallel.

At this time, the display control unit 130 according to this embodiment performs the movement control related to the viewpoint of the imaging unit 140 as in the trajectory indicated on the right side of FIG. 10. On the right side of FIG. 10, the viewpoint and imaging posture of the imaging unit 140 at time t=0 to 2 are represented by person models ML0 to ML2.

First, at time t=0, the display control unit 130 moves the viewpoint of the imaging unit 140 in the center-of-gravity movement direction GD of the user since there is no line-of-sight information in the previous state.

Next, at the time t=1, the display control unit 130 compares the line-of-sight direction SD at the previous state, that is, at the time t=0, with the line-of-sight direction SD acquired at the current state, that is, at the time t=1. In the case of the example illustrated in FIG. 10, the line-of-sight direction SD of the user is substantially parallel at time t=0 and time t=1, and thus the display control unit 130 maintains the movement direction of the viewpoint of the imaging unit 140 and shifts to the state at time t=2.

As described above, the display control unit 130 according to this embodiment can control the movement of the viewpoint of the imaging unit 140 using the time-series information in the line-of-sight direction. According to the above function according to this embodiment, the viewpoint of the imaging unit 140 can be moved straight even when the line-of-sight direction and the center-of-gravity movement direction are not substantially parallel.

FIG. 11 is a view illustrating control in the case of linearly moving obliquely with respect to the line-of-sight direction according to this embodiment. On the left side of FIG. 11, as in FIG. 10, the line-of-sight direction SD of the user U1 is indicated by a dotted arrow, and the center-of-gravity movement direction GD moving from CG0 to CG1 is indicated by a solid arrow. On the other hand, in the example illustrated in FIG. 11, the line-of-sight direction SD and the center-of-gravity movement direction GD are not substantially parallel.

At this time, the display control unit 130 according to this embodiment moves straight the viewpoint of the imaging unit 140 obliquely with respect to the line-of-sight direction as in the trajectory indicated on the right side of FIG. 11. On the right side of FIG. 11, the viewpoint and imaging posture of the imaging unit 140 at time t=0 to 2 are represented by person models ML0 to ML2.

First, as in the case illustrated in FIG. 10, at time t=0, the display control unit 130 moves the viewpoint of the imaging unit 140 in the center-of-gravity movement direction GD of the user since there is no line-of-sight information in the previous state.

Next, at the time t=1, the display control unit 130 compares the line-of-sight direction SD at the previous state, that is, at the time t=0, with the line-of-sight direction SD acquired at the current state, that is, at the time t=1. In the example illustrated in FIG. 11, the line-of-sight direction SD of the user is substantially parallel at time t=0 and time t=1. In this case, the display control unit 130 maintains the movement direction of the viewpoint of the imaging unit 140 even when the line-of-sight direction SD and the center-of-gravity movement direction GD are not substantially parallel, and shifts to the state at time t=2.

That is, in the second display control, when the line-of-sight direction in the current state and the line-of-sight direction in the previous state are substantially parallel, the display control unit 130 according to this embodiment can move the viewpoint of the imaging unit 140 in the center-of-gravity movement direction without rotating the imaging posture of the imaging unit 140.

As described above, in the second display control executed when the line-of-sight direction SD and the center-of-gravity movement direction GD are not substantially parallel, the display control unit 130 according to this embodiment realizes the straight movement in the center-of-gravity movement direction, that is, the straight movement in an oblique direction with respect to the line-of-sight direction by using the time-series information in the line-of-sight direction.

Incidentally, even when the time-series information in the line-of-sight direction is used, the viewpoint of the imaging unit 140 can be moved in a curved line as in the viewpoint movement control without using the time-series information in the line-of-sight direction as described above.

FIG. 12 is a view for explaining the curve movement of viewpoint using time-series information in the line-of-sight direction according to this embodiment. On the left side of FIG. 12, the line-of-sight directions SD0 and SD1 of the user U1 changing in time series are indicated by dotted arrows, and the center-of-gravity movement direction GD moving from CG0 to CG1 is indicated by solid arrows.

At this time, the display control unit 130 according to this embodiment moves the viewpoint of the imaging unit 140 in a curve in the direction of the gaze point PV as in the trajectory indicated on the right side of FIG. 12. On the right side of FIG. 12, the viewpoint and imaging posture of the imaging unit 140 at time t=0 to 2 are represented by person models ML0 to ML2.

First, as in the case illustrated in FIGS. 10 and 11, at time t=0, the display control unit 130 moves the viewpoint of the imaging unit 140 in the center-of-gravity movement direction GD of the user since there is no line-of-sight information in the previous state.

Next, at the time t=1, the display control unit 130 compares a line-of-sight direction SD0 at the previous state, that is, at the time t=0, with a line-of-sight direction SD1 acquired at the current state, that is, at the time t=1. In the example illustrated in FIG. 12, the line-of-sight direction SD0 and the line-of-sight direction SD1 are not substantially parallel, but it can be seen that the gaze point PV is fixed. In this way, when it is estimated that the line-of-sight direction in the current state and the line-of-sight direction in the previous state are not substantially parallel, and the gaze point of the user is not changed, the display control unit 130 rotates the imaging posture of the imaging unit 140 such that the image center of the visual field image approaches in the direction of the gaze point. At this time, the rotation amount related to the rotation of the imaging posture may be proportional to the magnitude of the angle difference θ between the current line-of-sight direction and the center-of-gravity movement direction.

According to the above function of the display control unit 130 according to this embodiment, the curve movement toward the gaze point can be controlled even when the time-series information in the line-of-sight direction is used.

Incidentally, when it is estimated that the line-of-sight direction in the current state and the line-of-sight direction in the previous state are not substantially parallel, and the gaze point of the user is changed, the display control unit 130 may rotate the imaging posture of the imaging unit 140 such that the image center of the visual field image approaches the line-of-sight direction in the current state.

Hereinbefore, the viewpoint movement control using the time-series information in the line-of-sight direction according to this embodiment has been described. As described above, the display control unit 130 according to this embodiment uses the time-series information of the line-of-sight direction, so that the viewpoint of the imaging unit 140 can be moved straight even when the line-of-sight direction and the center-of-gravity movement direction are not substantially parallel.

Incidentally, the display control unit 130 according to this embodiment can also switch the use and non-use of time-series information in the line-of-sight direction according to the mode and the mode of application. For example, when the imaging unit 140 reproduces the viewpoint of a moving body, which cannot continue to move autonomously in an oblique direction, such as an automobile, the display control unit 130 may perform movement control on the viewpoint on the basis of the angle difference between the line-of-sight direction and the center-of-gravity movement direction in the current state without using the time-series information of the line-of-sight direction. For example, when the application is a racing game or the like, the display control unit 130 can automatically perform setting so as to perform movement control without using time-series information in the line-of-sight direction.

On the other hand, it is also possible to perform switch automatically such that the viewpoint movement control using time-series information in the line-of-sight direction is performed when the imaging unit 140 reproduces the viewpoint of a moving body, which can move in an oblique direction, such as the above-described hoverboat.

Hereinbefore, the viewpoint movement control according to this embodiment has been described in detail. Incidentally, in the above description, a case where the display control unit 130 controls the viewpoint of the imaging unit 140 that is a virtual camera has been mainly described. However, as described above, the imaging unit 140 according to this embodiment may be a real camera provided with the unmanned moving body in real space.

Figure 13:
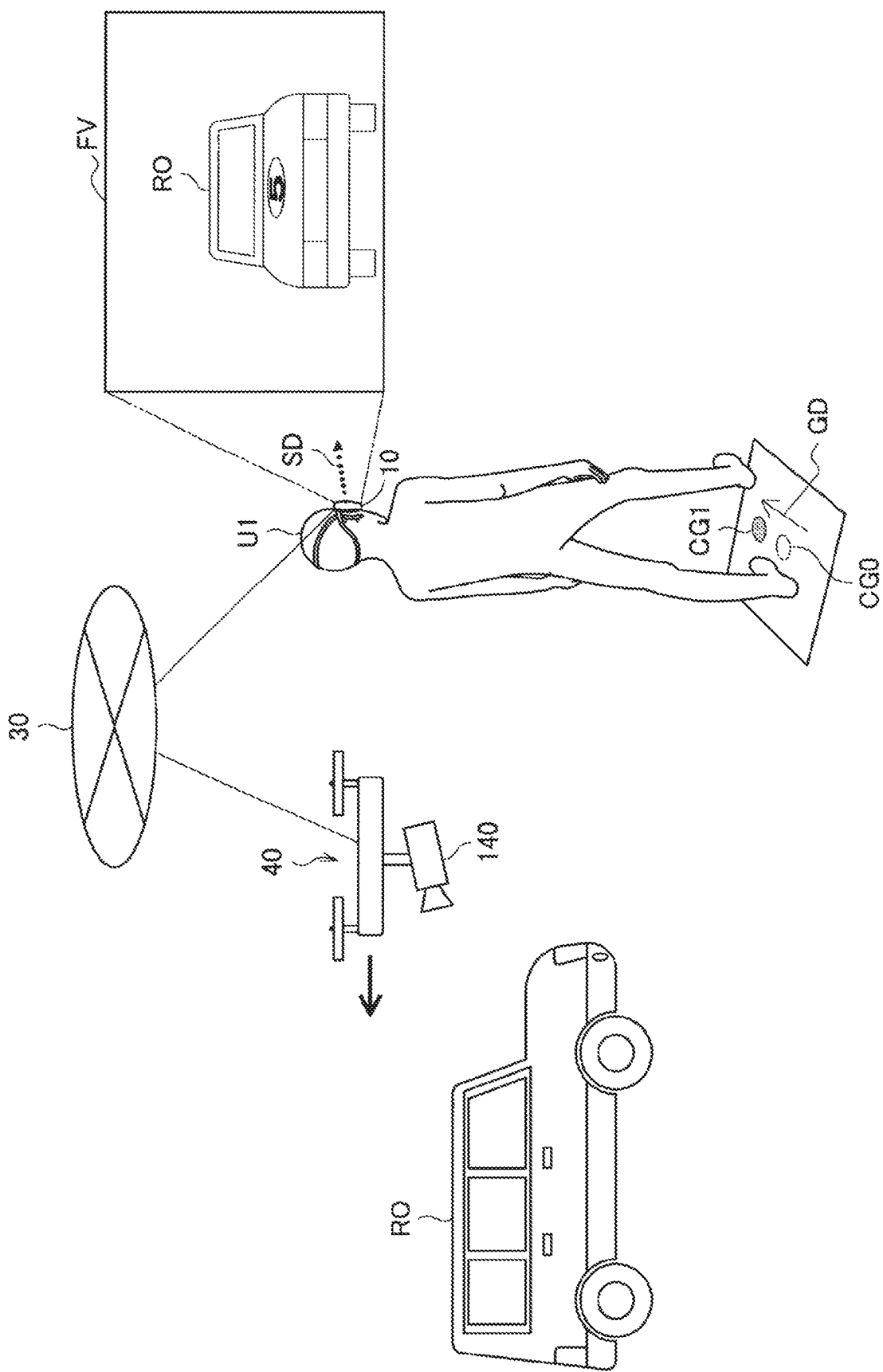
FIG. 13 is a view for explaining movement control in a case where an imaging unit according to the embodiment is a real camera.

FIG. 13 is a view for explaining movement control in a case where the imaging unit 140 according to this embodiment is a real camera. FIG. 13 illustrates a control target device 40 including the imaging unit 140 that is a real camera, and the user U1 that controls the movement of the control target device 40. Incidentally, FIG. 13 illustrates an example where the control target device 40 is an AV.

At this time, as described above, the user U1 can control the movement of the control target device 40 by changing the line-of-sight direction and the center-of-gravity movement direction, and can confirm the visual field image FV in real space where the imaging unit 140 captures an image along with the movement through the display unit 150 of the information processing apparatus 10. Referring to FIG. 13, a real object RO existing in front of the control target device 40 is illustrated in the visual field image FV. Incidentally, at this time, the display control unit 130 transmits a control signal related to movement to the control target device 40 via the network 30, and causes the display unit 150 to display the visual field image FV received from the control target device 40.

As described above, the display control unit 130 according to this embodiment can control the viewpoint of the real camera that captures an image in real space as well as that of the virtual camera. Incidentally, in the example illustrated in FIG. 13, the case where the imaging unit 140 is provided in the UAV has been described as an example. However, the imaging unit 140 according to this embodiment may be provided in, for example, a searcher that moves in the sea.

<<1.4. Flow of Control>>

Figure 14:
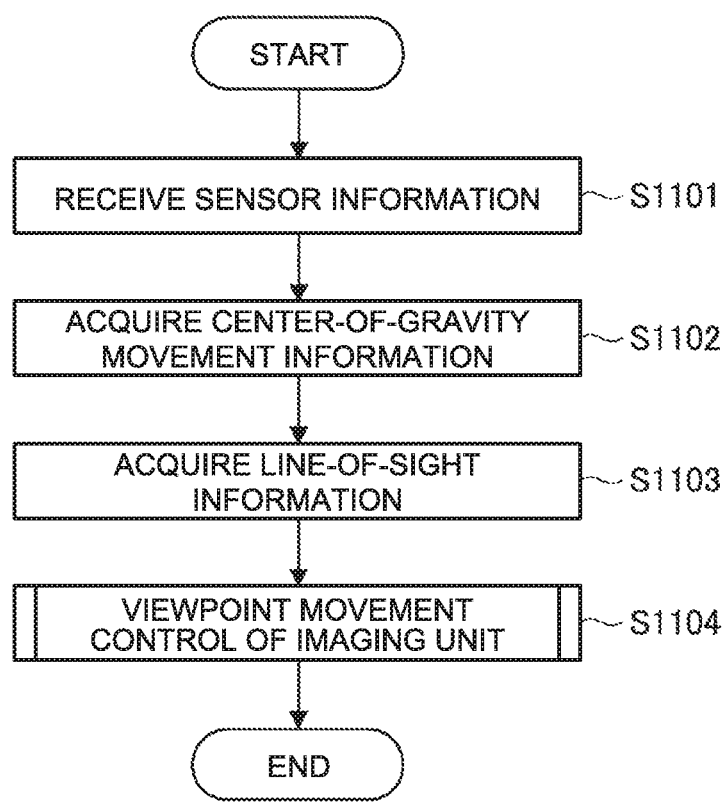
FIG. 14 is a flowchart illustrating a basic flow of control by the information processing apparatus according to the embodiment.

Next, the flow of control by the information processing apparatus 10 according to this embodiment will be described in detail. FIG. 14 is a flowchart illustrating a basic flow of control by the information processing apparatus 10 according to this embodiment.

Referring to FIG. 14, first, the communication unit 160 of the information processing apparatus 10 receives sensor information from the sensor device 20 (S1101).

Next, the movement information acquisition unit 110 acquires the center-of-gravity movement information related to the center-of-gravity movement direction of the user on the basis of the sensor information received in Step S1101 (S1102).

The line-of-sight information acquisition unit 120 acquires the line-of-sight information related to the line-of-sight direction of the user using a corneal reflection method or the like (S1103). Incidentally, as described above, the line-of-sight information acquisition unit 120 according to this embodiment may acquire the front direction of the information processing apparatus 10 as the line-of-sight information.

Next, the display control unit 130 executes movement control related to the viewpoint of the imaging unit 140 on the basis of the center-of-gravity movement information acquired by the movement information acquisition unit 110 in Step S1102 and the line-of-sight information acquired by the line-of-sight information acquisition unit 120 in Step S1103 (S1104).

Next, the flow of movement control related to the viewpoint of the imaging unit 140 in Step S1104 in FIG. 13 will be described in detail. As described above, the display control unit 130 according to this embodiment can perform viewpoint movement control that does not use time-series information in the line-of-sight direction and viewpoint movement control that uses time-series information in the line-of-sight direction.

Figure 15:
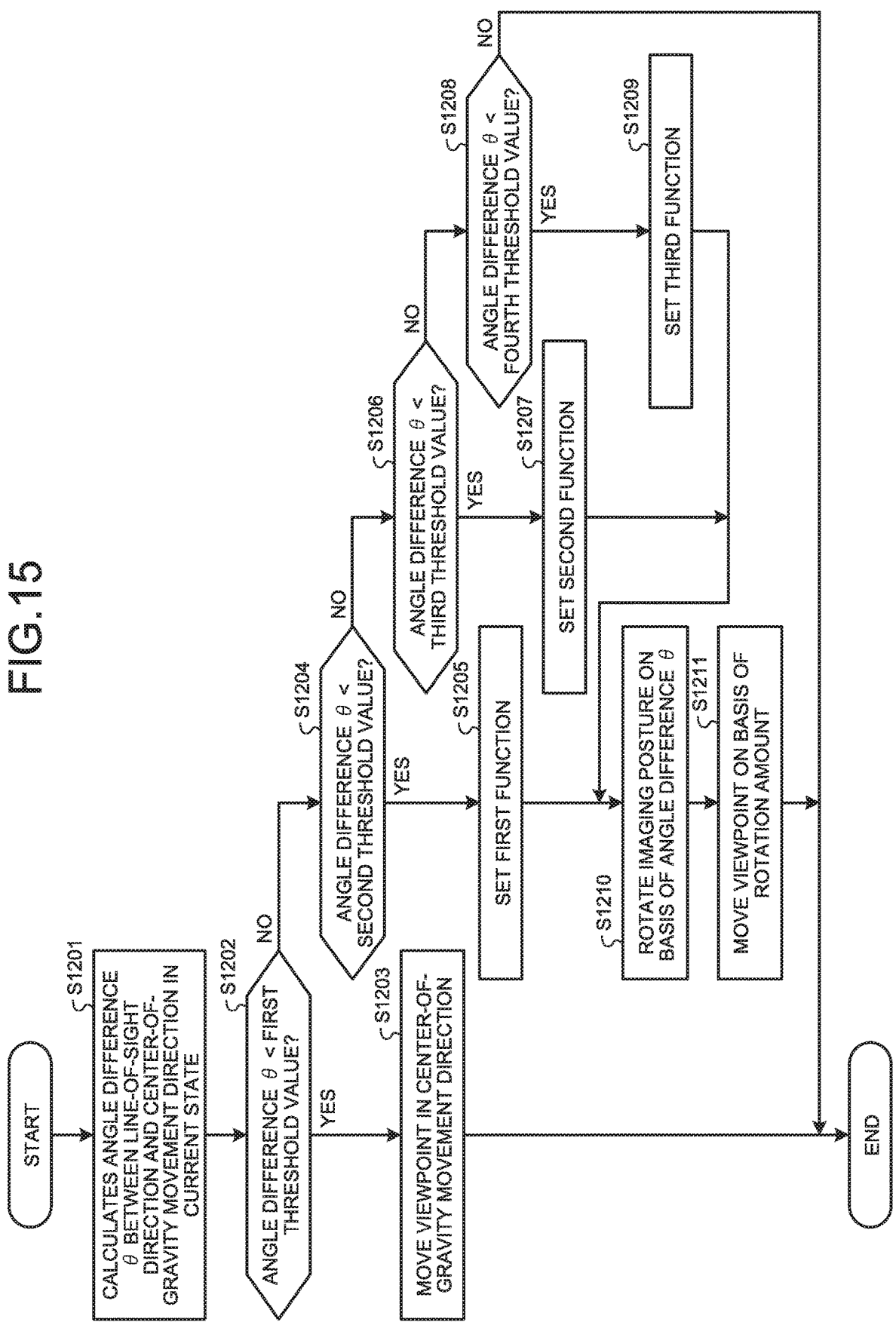
FIG. 15 is a flowchart illustrating a flow of the viewpoint movement control without using the time-series information in the line-of-sight direction according to the embodiment.

First, the flow of viewpoint movement control that does not use time-series information in the line-of-sight direction by the display control unit 130 will be described in detail. FIG. 15 is a flowchart illustrating a flow of the movement control of the viewpoint without using the time-series information in the line-of-sight direction according to this embodiment.

Referring to FIG. 15, first, the display control unit 130 calculates the angle difference θ between the line-of-sight direction in the current state and the center-of-gravity movement direction in the current state (S1201).

Subsequently, the display control unit 130 determines whether or not the angle difference θ calculated in Step S1201 is less than the first threshold value E1 (S1202). That is, the display control unit 130 determines whether or not the line-of-sight direction in the current state is substantially parallel to the center-of-gravity movement direction in the current state.

Herein, when the angle difference θ is less than the first threshold value E1 (S1202: YES), the display control unit 130 moves the viewpoint of the imaging unit 140 straight in the center-of-gravity movement direction while substantially maintaining the imaging posture (S1203).

On the other hand, when the angle difference θ is equal to or greater than the first threshold value E1 (S1202: NO), the display control unit 130 determines whether or not the angle difference θ calculated in Step S1201 is less than the second threshold value E2 (S1204).

Here, when the angle difference θ is less than the second threshold value E2 (S1202: YES), the display control unit 130 sets the first function F1 for the calculation of the rotation amount of the imaging posture (S1205).

On the other hand, when the angle difference θ is greater than or equal to the second threshold value E2 (S1203: NO), the display control unit 130 determines whether or not the angle difference θ calculated in Step S1201 is less than the third threshold value E3 (S1206).

Here, when the angle difference θ is less than the third threshold value E3 (S1206: YES), the display control unit 130 sets the second function F2 for the calculation of the rotation amount of the imaging posture (S1207).

On the other hand, when the angle difference θ is greater than or equal to the third threshold value E3 (S1206: NO), the display control unit 130 determines whether or not the angle difference θ calculated in Step S1201 is less than the fourth threshold value E4 (S1208).

Here, when the angle difference θ is less than the fourth threshold value E4 (S1208: YES), the display control unit 130 sets the third function F3 for the calculation of the rotation amount of the imaging posture (S1209).

On the other hand, when the angle difference θ is equal to or greater than the fourth threshold value E4 (S1208: YES), the display control unit 130 ends the viewpoint movement control in the current state.

On the other hand, when the function is set in Step S1205, S1207, or S1209, the display control unit 130 calculates the rotation amount corresponding to the angle difference θ using the function set above, and rotates the imaging posture of the imaging unit 140 on the basis of the rotation amount (S1210).

Subsequently, the display control unit 130 moves the viewpoint of the imaging unit 140 in the center-of-gravity movement direction on the basis of the rotation amount of rotating the imaging posture in Step S1210 (S1211).

Figure 16:
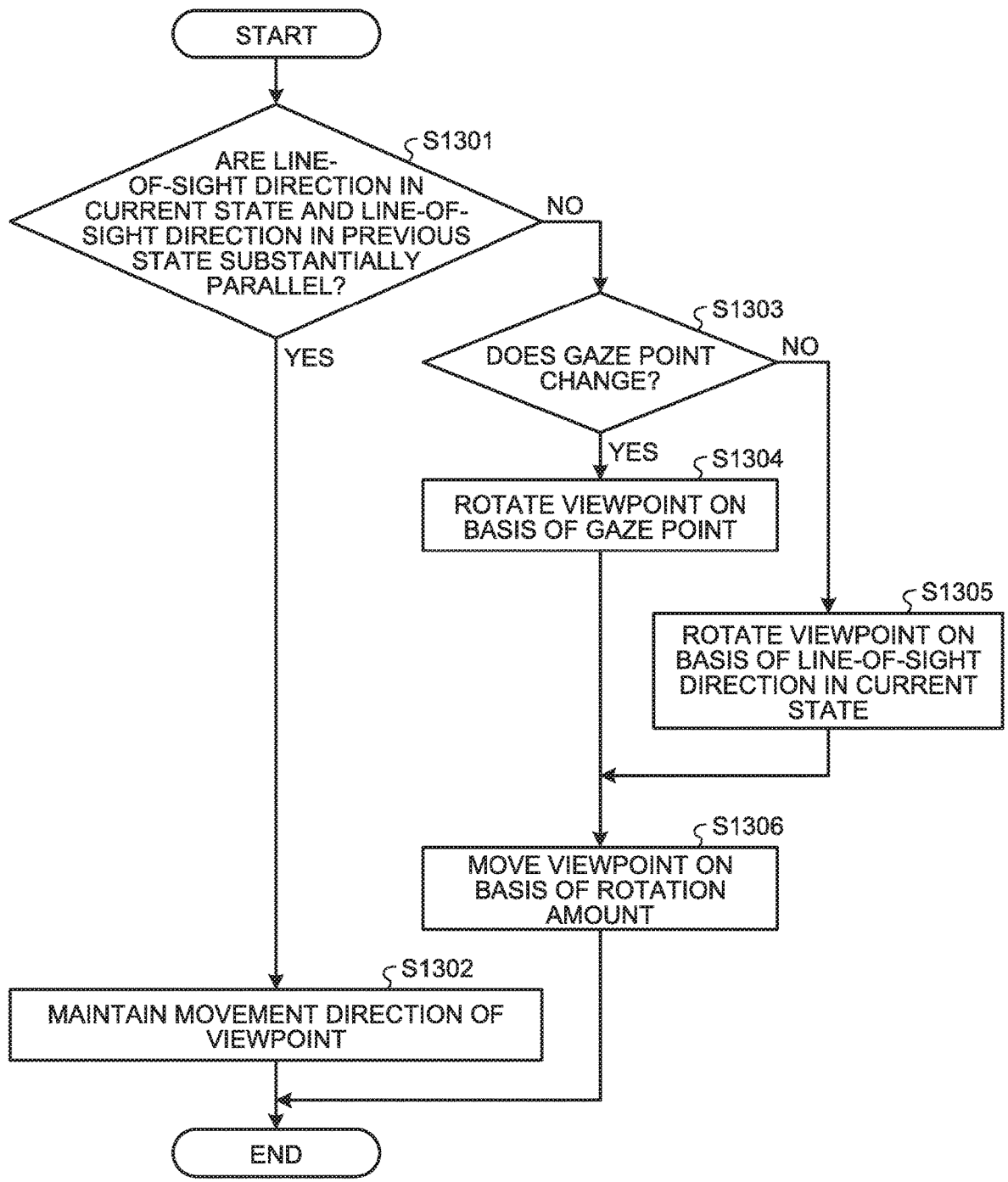
FIG. 16 is a flowchart illustrating a flow of the viewpoint movement control using the time-series information in the line-of-sight direction according to the embodiment.

Hereinbefore, the flow of viewpoint movement control that does not use time-series information in the line-of-sight direction by the display control unit 130 has been described. Next, the flow of viewpoint movement control using time-series information in the line-of-sight direction by the display control unit 130 will be described in detail. FIG. 16 is a flowchart illustrating a flow of the viewpoint movement control using the time-series information in the line-of-sight direction according to this embodiment.

Referring to FIG. 16, first, the display control unit 130 determines whether or not the line-of-sight direction in the current state and the line-of-sight direction in the previous state are substantially parallel (S1301).

Here, when the line-of-sight direction in the current state and the line-of-sight direction in the previous state are substantially parallel (S1301: YES), the display control unit 130 maintains the viewpoint movement candidates of the imaging unit 140 (S1302), and ends the viewpoint movement control in the current state.

On the other hand, when the line-of-sight direction in the current state and the line-of-sight direction in the previous state are not substantially parallel (S1301: NO), the display control unit 130 subsequently determines whether or not there is a change in the gaze point in the previous state and the gaze point in the current state (S1303).

Here, when there is a change in the gaze point in the previous state and the gaze point in the current state (S1303: YES), the display control unit 130 rotates the viewpoint of the imaging unit 140 on the basis of the line-of-sight direction in the current state (S1304).

On the other hand, when there is no change in the gaze point in the previous state and the gaze point in the current state (S1303: YES), the display control unit 130 rotates the viewpoint of the imaging unit 140 on the basis of the gaze point (S1305).

Next, the display control unit 130 moves the viewpoint of the imaging unit 140 in the center-of-gravity movement direction according to the rotation amount of rotating the viewpoint in Step S1305 or S1306 (S1306).

2. Second Embodiment

<<2.1. Overview>>

Next, a second embodiment of the present disclosure will be described. In the first embodiment described above, a case has been described in which the information processing apparatus 10 controls the movement of the viewpoint of the imaging unit 140 on the basis of the line-of-sight direction of the user and the center-of-gravity movement direction. According to the information processing apparatus 10 according to the first embodiment, the user intuitively can move the viewpoint of the imaging unit 140 by changing the movement of the center of gravity and the line of sight, and can acquire the visual field image corresponding to the viewpoint in an arbitrary movement direction.

On the other hand, the movement direction of the viewpoint of the imaging unit 140 may not necessarily be determined only by the movement of the center of gravity. For example, a gesture such as stepping can be used as a movement trigger related to movement control, and the movement direction of the viewpoint of the imaging unit 140 can be determined. In this case, for example, even a user, who is difficult to balance the body, such as an elderly person or an infant can control the movement related to the viewpoint of the imaging unit 140 by stepping while sitting on a chair.

However, when a gesture such as stepping is used as a movement trigger, there is a possibility that a deviation occurs between the direction intended by the user and the movement direction detected from the stepping, and how to correct the deviation becomes a problem.

Therefore, one of the features of the information processing apparatus 10 according to the second embodiment of the present disclosure is to correct the movement direction detected using various gestures as movement triggers by using the line-of-sight direction of the user.

Figure 17:
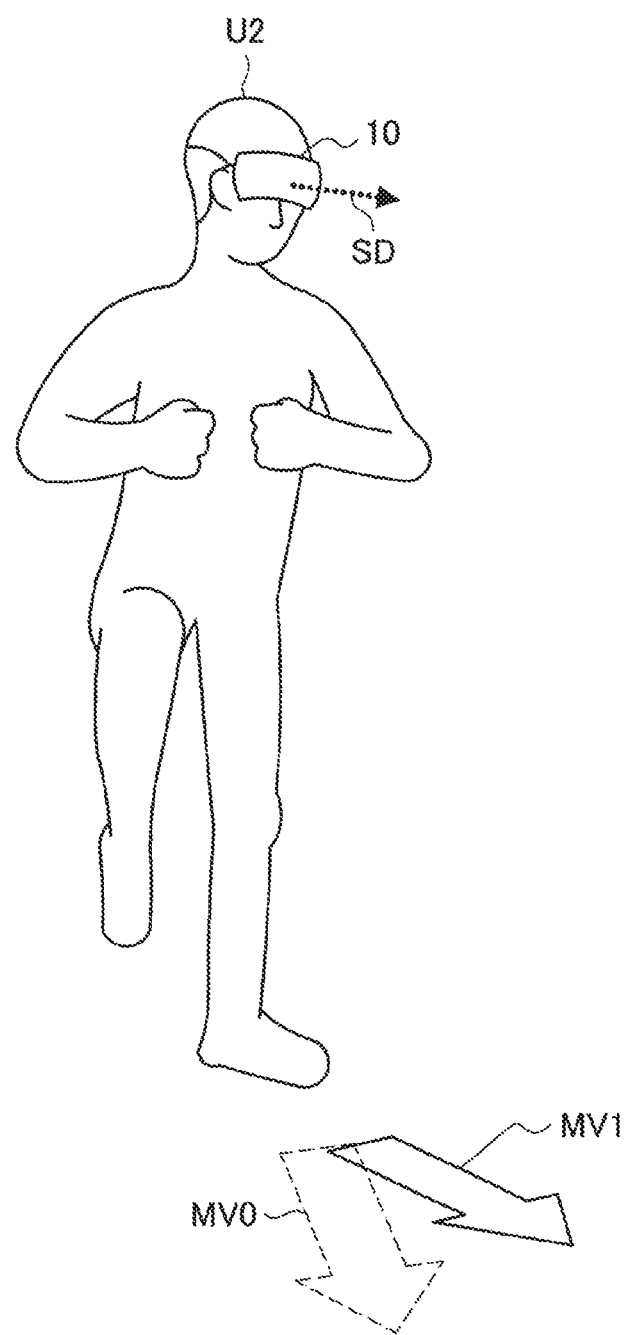
FIG. 17 is a view for explaining movement direction correction using the line-of-sight direction according to a second embodiment of the present disclosure according to the embodiment.

FIG. 17 is a view for explaining movement direction correction using the line-of-sight direction according to the second embodiment of the present disclosure. FIG. 17 illustrates a state where a user U2 wearing the information processing apparatus 10 steps. At this time, the movement information acquisition unit 110 of the information processing apparatus 10 according to this embodiment calculates a movement vector MV0 using the stepping of the user U2 as a movement trigger. Here, the movement vector according to this embodiment is information including a movement direction and a movement amount related to the viewpoint movement of the imaging unit 140.

At this time, when the line-of-sight direction SD of the user U2 acquired by the line-of-sight information acquisition unit 120 is within a predetermined range with reference to the movement vector MV0, the display control unit 130 can correct the movement vector MV0 on the basis of the line-of-sight direction SD to obtain a new movement vector MV1.

According to the above function of the information processing apparatus 10 according to this embodiment, even when there is a deviation between the movement direction detected from a gesture such as stepping and the movement direction desired by the user, the above-described deviation can be easily corrected by using the line-of-sight direction SD to realize highly accurate movement control.

In general, even when a person walks in a straight line, the person tends to move forward while observing persons and events that exist in various directions. This is considered to be the same even when the user wears the information processing apparatus 10.

For example, it is assumed that the user wears the information processing apparatus 10 and appreciates the scenery in the virtual space. At this time, it is easily expected that the user turns the line of sight to various virtual objects existing around while moving forward. It is also conceivable that the user looks up at the sky or looks at the ground.

However, at this time, the user does not necessarily want to move in the direction in which the line of sight is directed. For example, the user may simply want to observe a virtual object or the like existing in the line-of-sight direction, or may move the line of sight in response to sound generated in real space.

Therefore, one of the characteristics of the information processing apparatus 10 according to the second embodiment of the present disclosure is that when the user's line-of-sight direction deviates more than a predetermined amount from the movement direction detected using the gesture as a movement trigger, the movement direction is not corrected using the line-of-sight direction, and instead the movement amount is limited.

According to the above-described function of the information processing apparatus 10 according to this embodiment, the user can slowly observe a gaze target existing in the surroundings without changing the movement direction, and can obtain a sense closer to movement in reality. Further, according to the above function, an effect of reducing the symptoms of sickness associated with virtual reality (VR) viewing can be expected while increasing the immersive feeling while moving in the virtual space.

Hereinafter, the two functions according to the second embodiment of the present disclosure will be described in detail. Incidentally, in the following description, the differences from the first implementation system will be mainly described, and detailed description of configurations and features common to the first embodiment will be omitted.

<<2.2. Details Related to Movement Vector Correction>>

Next, the movement vector correction by the display control unit 130 according to this embodiment will be described in detail. As described above, the display control unit 130 according to this embodiment has a function of correcting the movement vector calculated by the movement information acquisition unit 110 on the basis of the line-of-sight direction of the user.

More specifically, the display control unit 130 according to this embodiment may correct the movement direction of the movement vector on the basis of the line-of-sight direction when the angle difference between the line-of-sight direction of the user and the movement vector falls within a predetermined range.

When the angle difference between the line-of-sight direction of the user and the movement vector exceeds a predetermined value, the display control unit 130 according to this embodiment performs correction to reduce the movement amount of the movement vector on the basis of the line-of-sight direction.

Figure 18:
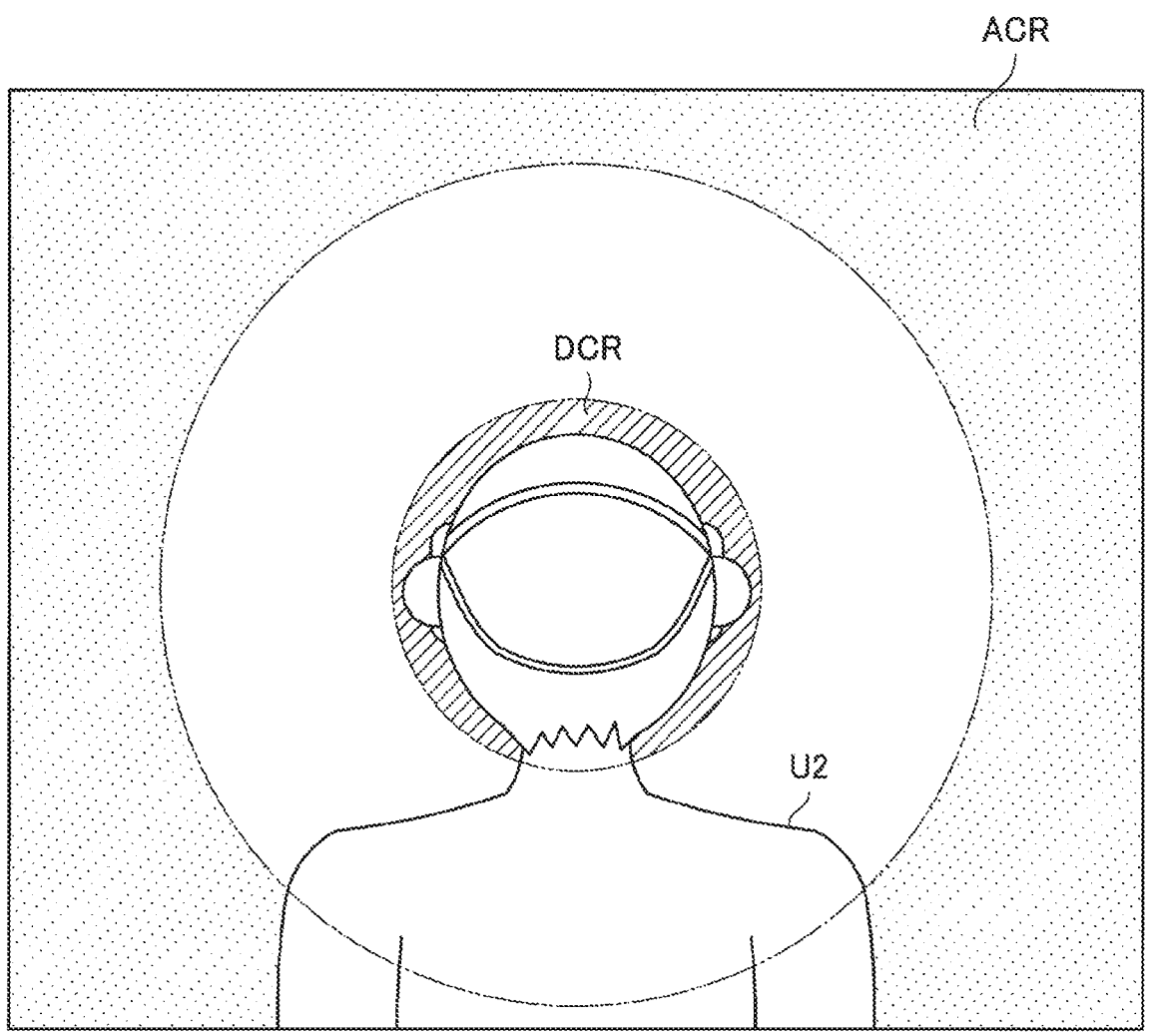
FIG. 18 is a view for explaining a correction area of a movement vector according to the embodiment.

FIG. 18 is a view for explaining the correction area of the movement vector according to this embodiment. FIG. 18 is a view schematically illustrating two correction areas when the user U2 is observed from behind. As illustrated in FIG. 18, the correction area according to this embodiment is roughly divided into a direction correction area DCR and a movement amount correction area ACR.

Herein, the direction correction area DCR is an area used by the display control unit 130 to determine the direction correction of the movement vector. Specifically, when the line-of-sight direction SD of the user U2 falls within the direction correction area DCR, the display control unit 130 can correct the movement direction of the movement vector calculated by the movement information acquisition unit 110 on the basis of the line-of-sight direction SD.

According to the above function of the display control unit 130 according to this embodiment, a slight deviation between the movement direction desired by the user and the movement direction detected on the basis of the movement trigger is corrected using the line-of-sight direction of the user. Thus, it is possible to realize more accurate movement control.

On the other hand, the movement amount correction area ACR is an area used by the display control unit 130 to determine the movement amount correction of the movement vector. Specifically, when the line-of-sight direction SD of the user U2 is located in the movement amount correction area ACR, the display control unit 130 can correct the movement amount of the movement vector calculated by the movement information acquisition unit 110 on the basis of the line-of-sight direction SD.

According to the function of the display control unit 130 according to this embodiment, it is possible to effectively reduce the possibility of malfunction that corrects the movement direction in a direction not intended by the user. Moreover, according to the function, the user can maintain the movement in the movement direction even while observing the surrounding gaze target.

Figure 19:
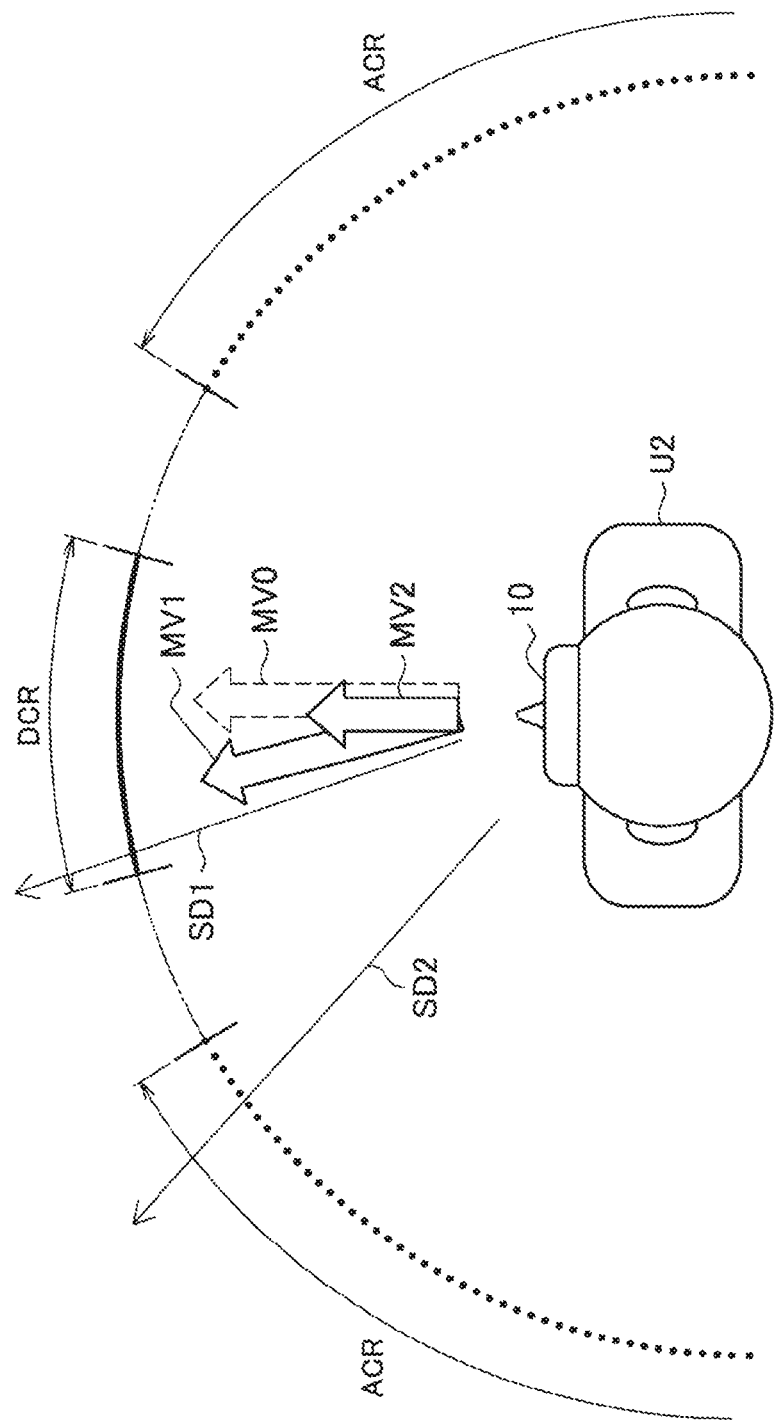
FIG. 19 is a view illustrating two correction areas according to the embodiment from the top of a user U2.
Figure 20:
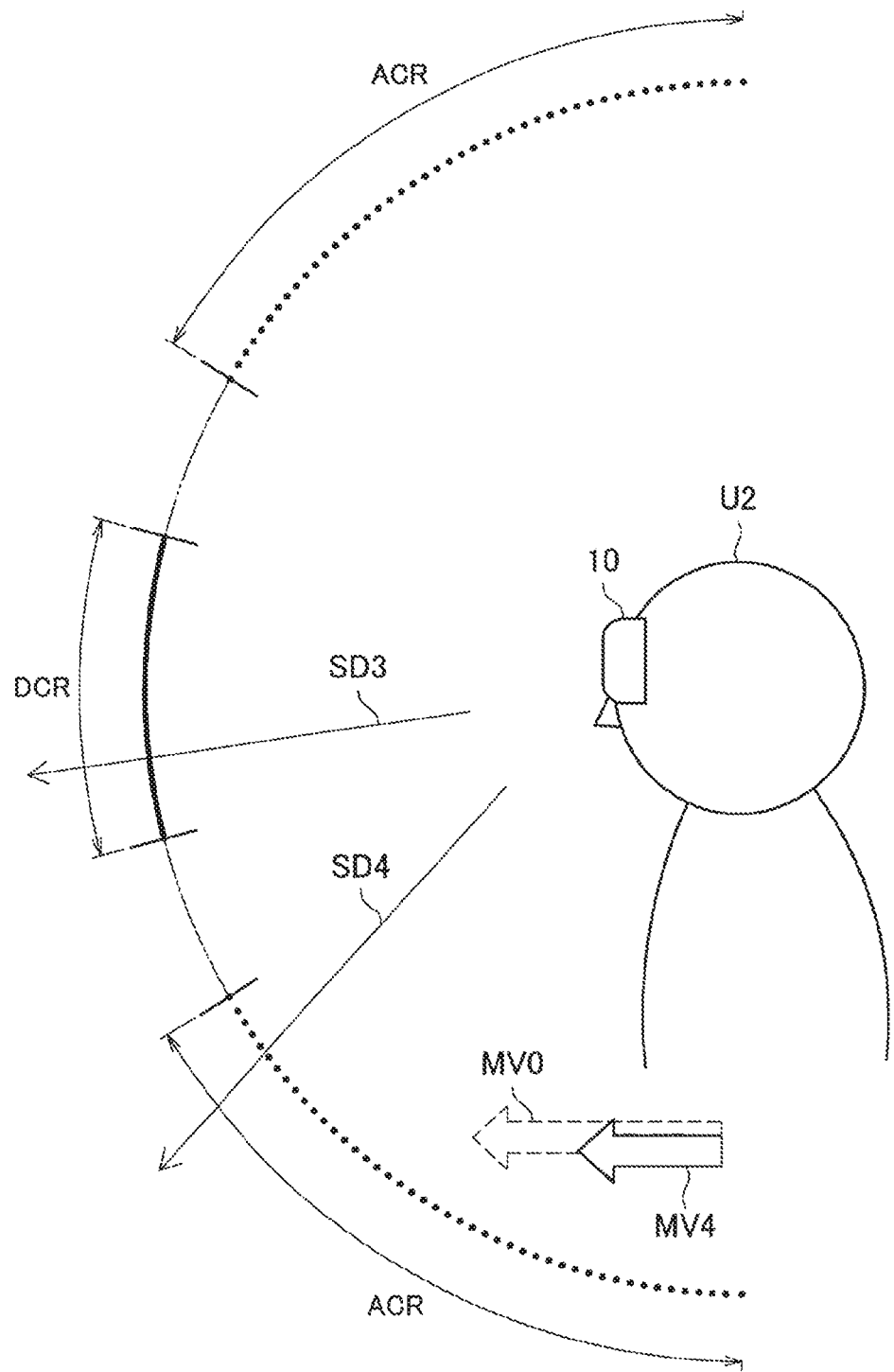
FIG. 20 is a view illustrating two correction areas according to the embodiment from the side of the user U2.

Next, with reference to FIG. 19, the description of the correction of the movement vector according to this embodiment will be continued. FIG. 19 is a view illustrating two correction areas according to this embodiment from the top of the user U2. In FIG. 18, the two correction areas are illustrated from behind the user, and thus the direction correction area DCR and the movement amount correction area ACR can be seen to have a two-dimensional planar shape. However, the direction correction area DCR and the movement amount correction area ACR are actually formed in a spherical shape surrounding the user U2 as illustrated in FIG. 19 and FIG. 20 described later.

Here, as illustrated in FIG. 19, when the line-of-sight direction SD1 of the user U2 is located in the direction correction area DCR, the display control unit 130 according to this embodiment can correct the movement direction of the movement vector MV0 calculated by the movement information acquisition unit 110 on the basis of the line-of-sight direction SD1 and can obtain a new movement vector MV1.

When the line-of-sight direction SD2 of the user U2 is located in the movement amount correction area ACR, the display control unit 130 according to this embodiment can correct the movement amount of the movement vector MV0 calculated by the movement information acquisition unit 110 on the basis of the line-of-sight direction SD1 and can obtain a new movement vector MV2.

Incidentally, when the imaging unit 140 is a virtual camera that reproduces the viewpoint of a moving body that moves in contact with the ground surface, or a real camera that has a translation axis with two degrees of freedom provided in the moving body, the display control unit 130 may correct the movement direction of the movement vector MV0 defined in the horizontal direction on the basis of the line-of-sight direction SD1.

On the other hand, when the imaging unit 140 is a virtual camera that reproduces the viewpoint of a moving body that moves in the air, the sea, or the like, or a real camera that has a translation axis with three degrees of freedom provided in the moving body, the display control unit 130 may correct the movement direction of the movement vector MV0 defined in the horizontal direction and the vertical direction on the basis of the line-of-sight direction SD1.

FIG. 20 is a view illustrating two correction areas according to this embodiment from the side of the user U2. Here, as illustrated in FIG. 20, when the line-of-sight direction SD3 of the user U2 is positioned in the direction correction area DCR in the vertical direction, the display control unit 130 according to this embodiment may correct the movement direction of the movement vector MV0 to the vertical direction on the basis of the line-of-sight direction SD3 only when the imaging unit 140 has the above-described translation axis with three degrees of freedom.

When the line-of-sight direction SD4 of the user U2 is located in the movement amount correction area ACR, the display control unit 130 according to this embodiment can correct the movement amount of the movement vector MV0 calculated by the movement information acquisition unit 110 on the basis of the line-of-sight direction SD4 and can obtain a new movement vector MV4.

Incidentally, the control of the movement amount based on the line-of-sight direction in the vertical direction can also be realized in combination with the first embodiment of the present disclosure. That is, the display control unit 130 in the present disclosure may perform the first display control and the second display control on the basis of the difference between the line-of-sight direction in the horizontal direction and the center-of-gravity movement direction, and may control the movement amount related to the movement of the viewpoint of the imaging unit 140 on the basis of the line-of-sight direction in the vertical direction.

As described above, when the line-of-sight direction of the user acquired by the line-of-sight information acquisition unit 120 is located in the correction area, the display control unit 130 according to this embodiment can correct the movement vector calculated by the movement information acquisition unit 110 on the basis of the line-of-sight direction. According to the above function of the display control unit 130 according to this embodiment, it is possible to realize the movement of the viewpoint closer to the actual movement, and to provide a high immersive feeling to the user.

Incidentally, in the above description, the stepping gesture is mainly described as an example of the movement trigger, but the movement trigger according to this embodiment is not limited to the example. For example, as an action class when moving in the virtual space, in addition to walking and running forward, various patterns such as walking sideways, moving backward, rotating on the spot, approaching virtual objects, and passing through between virtual objects can be considered.

The information processing apparatus 10 according to this embodiment can realize highly accurate operation control by detecting a movement trigger corresponding to the class as described above and performing correction using the line-of-sight direction. In addition, the correction of the action class related to the interaction with the virtual object or the like can be realized by using the relationship between the virtual object in the virtual space and the line-of-sight direction of the user as a feature.

Figure 21:
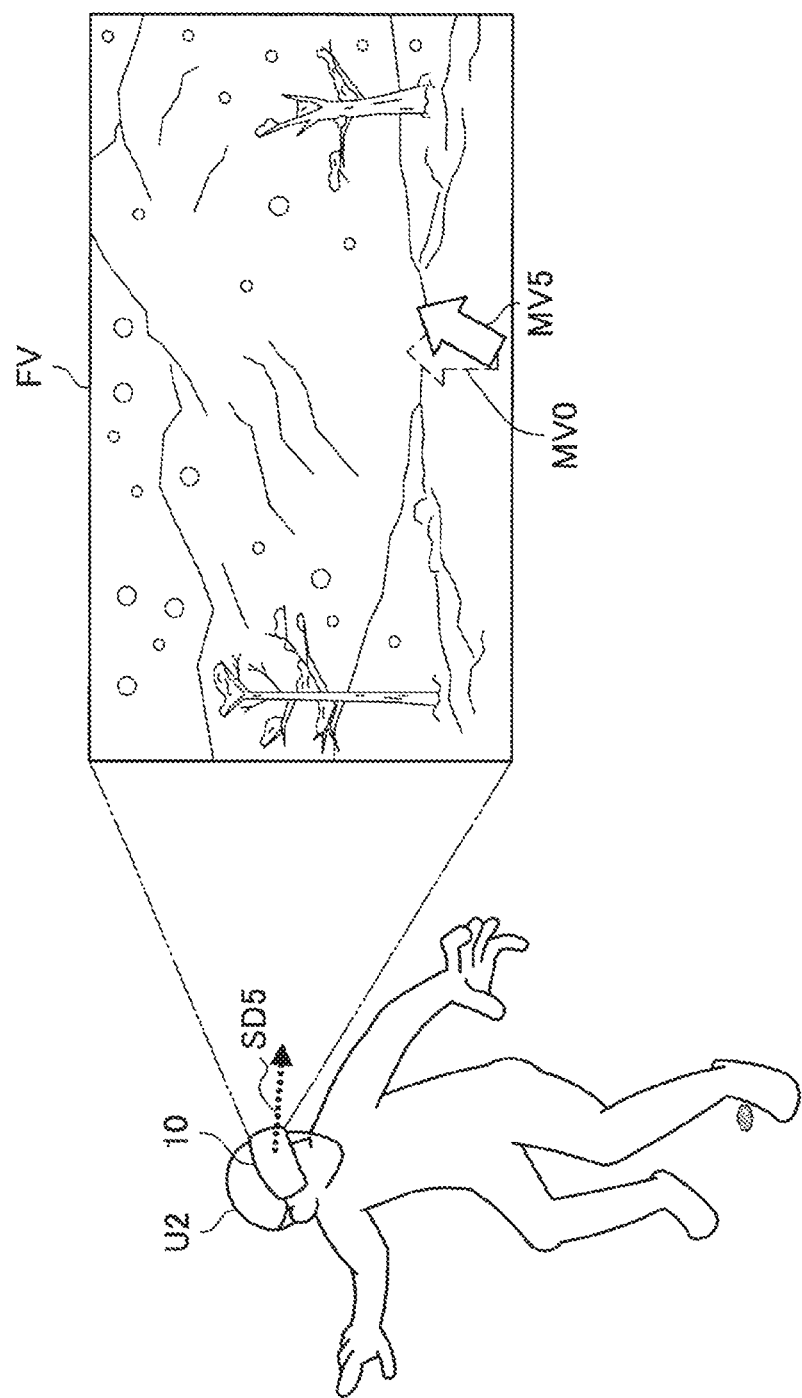
FIG. 21 is a view for explaining an example of a movement trigger and an action class according to the embodiment.

Here, an example of the movement trigger and the action class according to this embodiment will be described with reference to FIG. 21. FIG. 21 is a view for explaining the example of the movement trigger and the action class according to this embodiment.

FIG. 21 illustrates a situation where the user U2 wearing the information processing apparatus 10 is experiencing a snowboard in the virtual space. At this time, for example, the movement information acquisition unit 110 according to this embodiment may detect the center-of-gravity movement of the user's body as a movement trigger as illustrated the left in the drawing. At this time, the display control unit 130 may perform sliding and stop control as an action class corresponding to the above-described center-of-gravity movement.

The display control unit 130 can correct the sliding direction on the basis of the line-of-sight direction SD5 of the user. In the visual field image illustrated on the right side of the drawing, it is schematically shown that the display control unit 130 corrects the movement vector MV0 calculated by the movement information acquisition unit 110 using the movement of the center of gravity of the user as a movement trigger on the basis of the line-of-sight direction SD5 and creates a new movement vector MV5.

<<2.3 Control Flow>>

Figure 22:
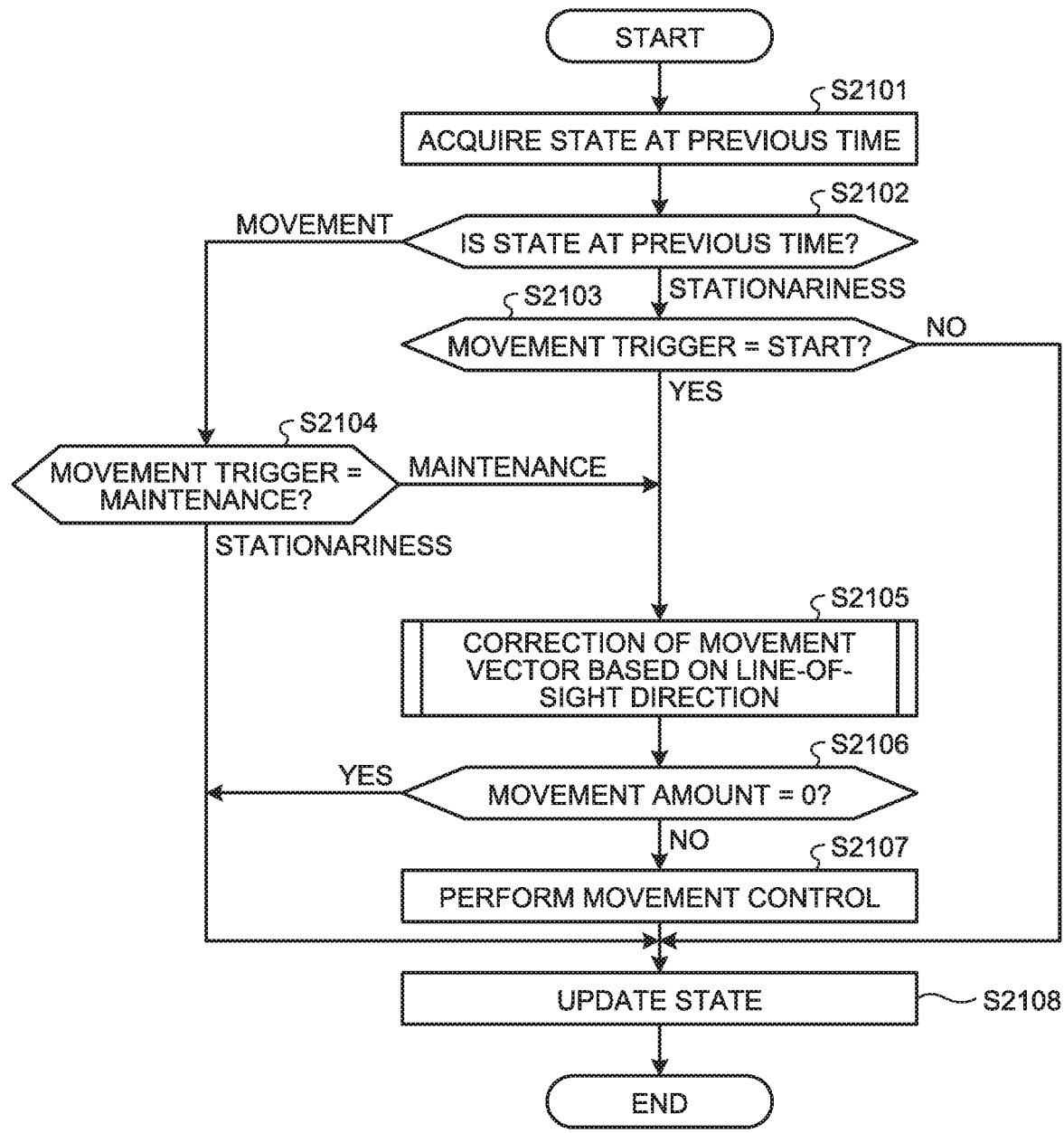
FIG. 22 is a flowchart illustrating a flow of a control by the information processing apparatus according to the embodiment.

Next, the flow of control by the information processing apparatus 10 according to this embodiment will be described in detail. FIG. 22 is a flowchart illustrating the flow of the control by the information processing apparatus 10 according to this embodiment.

Referring to FIG. 22, first, the display control unit 130 acquires the state at the previous time (S2101).

Subsequently, the display control unit 130 determines whether the state at the previous time acquired in Step S2101 is a moving state or a stationary state (S2102).

Here, when the state at the previous time is a stationary state (S2102: stationariness), the display control unit 130 subsequently determines whether or not the movement trigger detected at the current time by the movement information acquisition unit 110 indicates movement start (S2103).

Here, when the movement trigger does not indicate the movement start (S2103: NO), the display control unit 130 updates the state at the current time as a stationary state (S2108).

On the other hand, when it is determined in Step S2102 that the state at the previous time is the moving state (S2012: movement), the display control unit 130 subsequently determines whether the movement trigger detected at the current time by the movement information acquisition unit 110 indicates the maintenance of the movement or the stationariness of the movement (S2104).

Here, when the movement trigger indicates the stationariness of the movement (S2104: stationariness), the display control unit 130 updates the state at the current time as a stationary state (S2108).

On the other hand, when the movement trigger indicates the maintenance of the movement in Step S2104 (S2104: maintenance), or when the movement trigger indicates the start of the movement in Step S2103 (S2104: YES), the display control unit 130 executes the correction control of the movement vector based on the line-of-sight direction of the user acquired by the line-of-sight information acquisition unit 120 (S2105).

Next, the display control unit 130 determines whether or not the movement amount has become zero in the correction control in Step S2105 (S2106).

Here, when the movement amount is zero, the display control unit 130 updates the state at the current time as a stationary state (S2108).

On the other hand, when the movement amount is larger than zero, the display control unit 130 performs movement control related to the viewpoint of the imaging unit 140 on the basis of the movement amount (S2107).

Subsequently, the display control unit 130 updates the state at the time as a moving state (S2108), and ends the movement control process at the current time.

Figure 23:
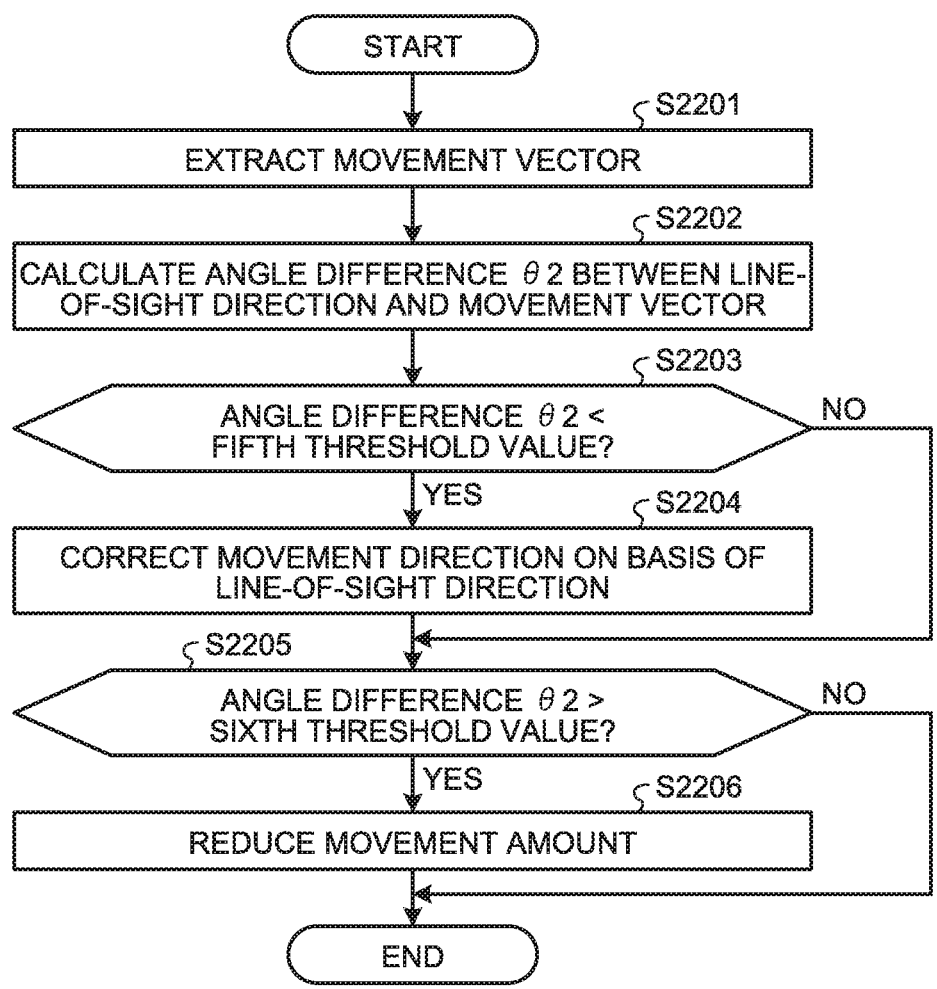
FIG. 23 is a flowchart illustrating a flow of a correction control of the movement vector according to the embodiment.

Next, the flow of the correction control of the movement vector in Step S2105 of FIG. 22 will be described in detail. FIG. 23 is a flowchart illustrating the flow of the correction control of the movement vector according to this embodiment.

Referring to FIG. 23, first, the movement vector is calculated on the basis of the movement trigger detected by the movement information acquisition unit 110 (S2201).

Next, the display control unit 130 calculates an angle difference θ2 between the line-of-sight direction of the user acquired by the line-of-sight information acquisition unit 120 and the movement direction of the movement vector calculated by the movement information acquisition unit 110 in Step S2201 (S2102).

Next, the display control unit 130 determines whether or not the angle difference θ2 calculated in Step S2102 is equal to or less than a fifth threshold value E5 (S2203). Here, the fifth threshold value E5 is a value that defines the range of the direction correction area DCR around the movement direction of the movement vector. That is, the display control unit 130 determines whether or not the line-of-sight direction of the user is located in the range of the direction correction area DCR.

Here, when the angle difference θ2 is equal to or less than the fifth threshold value E5 (S2203: YES), that is, when the line-of-sight direction is located in the direction correction area DCR, the display control unit 130 corrects the movement direction of the movement vector on the basis of the line-of-sight direction (S2204).

On the other hand, when the angle difference θ2 is equal to or less than the fifth threshold value E5 (S2203: YES), the correction of the movement direction in Step S2204 is skipped.

Next, the display control unit 130 determines whether or not the angle difference θ2 calculated in Step S2102 is equal to or greater than a sixth threshold value E6 (S2205). Here, the sixth threshold value E6 is a value that defines the range of the movement amount correction area ACR around the movement direction of the movement vector. That is, the display control unit 130 determines whether or not the line-of-sight direction of the user is located in the range of the direction correction area ACR.

Here, when the angle difference θ2 is equal to or less than the sixth threshold value E6 (S2205: YES), that is, when the line-of-sight direction is located in the movement amount correction area ACR, the display control unit 130 reduces the movement amount of the movement vector on the basis of the line-of-sight direction (S2206).

On the other hand, when the angle difference θ2 is equal to or less than the sixth threshold value E6 (S2205: YES), the movement direction correction in Step S2206 is skipped, and the movement vector correction control ends.

3. Hardware Configuration Example

Figure 24:
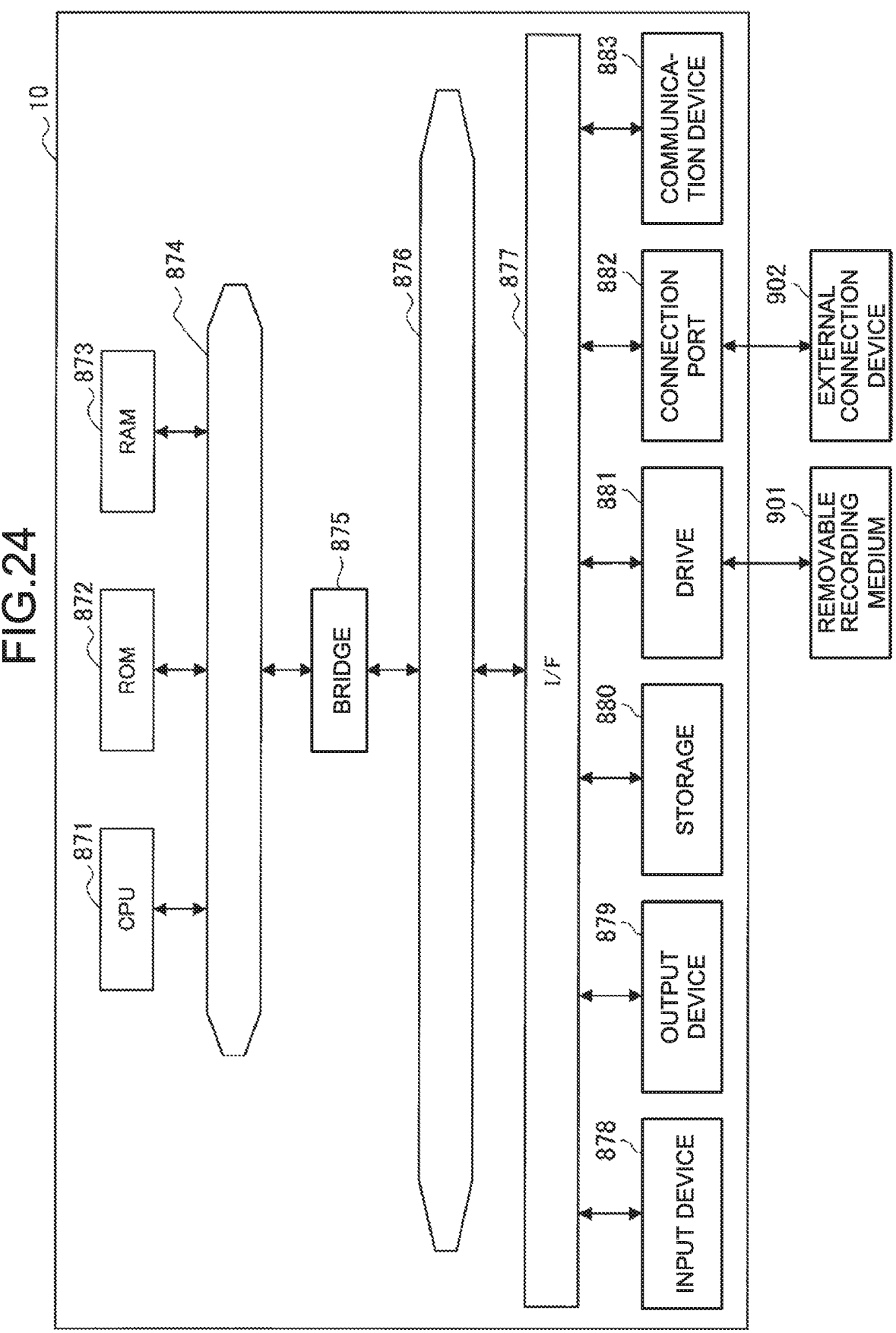
FIG. 24 is a diagram illustrating a hardware configuration example according to an embodiment of the present disclosure.

Next, a hardware configuration example of the information processing apparatus 10 according to an embodiment of the present disclosure will be described. FIG. 24 is a block diagram illustrating a hardware configuration example of the information processing apparatus 10 according to the embodiment of the present disclosure. Referring to FIG. 24, the information processing apparatus 10 includes, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Incidentally, the hardware configuration illustrated here is an example, and some of the components may be omitted. Moreover, you may further include components other than the component described here.

(CPU 871)

The CPU 871 functions as, for example, an arithmetic processing unit or a control unit, and controls the overall operation of each component or a part thereof on the basis of various programs recorded in the ROM 872, the RAM 873, the storage 880, or a removable recording medium 901.

(ROM 872 and RAM 873)

The ROM 872 is a means for storing a program read by the CPU 871, data used for calculation, and the like. The RAM 873 temporarily or permanently stores, for example, a program read into the CPU 871 and various parameters that change as appropriate when the program is executed.

(Host Bus 874, Bridge 875, External Bus 876, and Interface 877)

The CPU 871, the ROM 872, and the RAM 873 are connected to each other via, for example, the host bus 874 capable of high-speed data transmission. On the other hand, the host bus 874 is connected to an external bus 876 having a relatively low data transmission speed via a bridge 875, for example. The external bus 876 is connected to various components via the interface 877.

(Input Device 878)

As the input device 878, for example, a mouse, a keyboard, a touch panel, a button, a switch, a lever, and the like are used. Furthermore, as the input device 878, a remote controller (hereinafter referred to as a remote controller) capable of transmitting a control signal using infrared rays or other radio waves may be used. The input device 878 includes a voice input device such as a microphone.

(Output Device 879)

The output device 879 is a device capable of visually or audibly notifying acquired information to a user and is, for example, a display device such as a cathode ray tube (CRT), LCD, or organic EL, an audio output device such as a speaker or a headphone, a printer, a mobile phone, a facsimile, or the like. In addition, the output device 879 according to the present disclosure includes various vibration devices that can output a tactile stimulus.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on a removable recording medium 901 such as a magnetic disk, an optical disk, a magneto-optical disk, or a semiconductor memory, or writes information to the removable recording medium 901, for example.

(Removable Recording Medium 901)

The removable recording medium 901 is, for example, a DVD media, a Blu-ray (registered trademark) media, a HD DVD media, various semiconductor storage media, and the like. Of course, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE1394 port, a small computer system interface (SCSI), an RS-232C port, or an optical audio terminal.

(External Connection Device 902)

The external connection device 902 is, for example, a printer, a portable music player, a digital camera, a digital video camera, or an IC recorder.

(Communication Device 883)

The communication device 883 is a communication device for connection to a network and is, for example, a communication card for wired or wireless LAN, Bluetooth (registered trademark) or wireless USB (WUSB), a router for optical communication, a router for asymmetric digital subscriber line (ADSL), or various communication modems.

4. Summary

As described above, the information processing apparatus 10 according to the first embodiment of the present disclosure executes the first display control that realizes the straight movement when the line-of-sight direction of the user and the center-of-gravity movement direction are substantially parallel and executes the second display control that realizes the curve movement when the line-of-sight direction of the user and the center-of-gravity movement direction are not substantially parallel. In addition, on the basis of the line-of-sight direction of the user, the information processing apparatus 10 according to the first embodiment of the present disclosure can correct the movement direction and the movement amount of the movement vector calculated on the basis of the movement trigger. According to such a configuration, it is possible to more intuitively control the viewpoint related to the display image.

Hereinbefore, the preferred embodiments of the present disclosure have been described in detail with reference to the accompanying drawings, but the technical scope of the present disclosure is not limited to such examples. It is obvious that a person having ordinary knowledge in the technical field of the present disclosure can conceive various changes or modifications within the scope of the technical idea described in the claims. Of course, it is understood that these also belong to the technical scope of the present disclosure.

Further, the effects described in this specification are merely illustrative or exemplary and are not limited. That is, the technology according to the present disclosure can exhibit other effects that are apparent to those skilled in the art from the description of this specification in addition to or instead of the above effects.

In addition, each step related to the processing of the information processing apparatus 10 of this specification does not necessarily have to be processed in time series in the order described in the flowchart. For example, the steps related to the processing of the information processing apparatus 10 may be processed in an order different from the order described in the flowchart, or may be processed in parallel.

Incidentally, the following configurations also belong to the technical scope of the present disclosure.

(1)

An information processing apparatus comprising:

a line-of-sight information acquisition unit which acquires line-of-sight information related to a line-of-sight direction of a user;

a movement information acquisition unit which acquires a center-of-gravity movement information related to a center-of-gravity movement direction of a body of the user; and a display control unit which performs a first display control for controlling a display device to provide the user with a visual field image according to an imaging posture of an imaging unit by moving a viewpoint of the imaging unit in the center-of-gravity movement direction while substantially maintaining the imaging posture of the imaging unit when the line-of-sight direction and the center-of-gravity movement direction are substantially parallel and performs a second display control for controlling the display device to provide the user with the visual field image by rotating the imaging posture of the imaging unit and moving the viewpoint of the imaging unit in the center-of-gravity movement direction when the line-of-sight direction and the center-of-gravity movement direction are not substantially parallel.

(2)

The information processing apparatus according to (1), wherein in the second display control, the display control unit determines a rotation direction in which the imaging posture of the imaging unit is rotated on a basis of the line-of-sight direction.

(3)

The information processing apparatus according to (1) or (2), wherein in the second display control, the display control unit rotates the imaging posture of the imaging unit such that an image center of the visual field image approaches the line-of-sight direction.

(4)

The information processing apparatus according to any one of (1) to (3), wherein in the second display control, the display control unit determines a rotation amount in which the imaging posture of the imaging unit is rotated on a basis of a magnitude of an angle difference between the line-of-sight direction and the center-of-gravity movement direction.

(5)

The information processing apparatus according to (4), wherein in the second display control, when the angle difference is less than a determination value and when the angle difference is equal to or greater than the determination value, the display control unit determines the rotation amount using a different calculation method and moves the viewpoint of the imaging unit by a movement amount corresponding to the rotation amount in the center-of-gravity movement direction.

(6)

The information processing apparatus according to (5), wherein in the second display control, when the angle difference is less than the determination value, the display control unit determines the rotation amount such that a movement direction of the viewpoint of the imaging unit curves toward the line-of-sight direction, and rotates the imaging posture of the imaging unit and moves the viewpoint of the imaging unit by the movement amount corresponding to the rotation amount in the center-of-gravity movement direction.

(7)

The information processing apparatus according to (5) or (6), wherein in the second display control, when the angle difference is less than the determination value, and the angle difference is less than a predetermined value, the display control unit determines the rotation amount such that a degree of rotation decreases as the angle difference decreases.

(8)

The information processing apparatus according to any one of (5) to (7), wherein in the second display control, when the angle difference is less than the determination value, and the angle difference is equal to or greater than a predetermined value, the display control unit determines the rotation amount such that a degree of rotation increases as the angle difference decreases.

(9)

The information processing apparatus according to any one of (5) to (8), wherein in the second display control, when the angle difference is equal to or greater than the determination value, the display control unit determines the rotation amount such that a movement direction of the viewpoint of the imaging unit wraps around toward the line-of-sight direction, and rotates the imaging posture of the imaging unit and moves the viewpoint of the imaging unit by the movement amount corresponding to the rotation amount in the center-of-gravity movement direction.

(10)

The information processing apparatus according to any one of (5) to (9), wherein in the second display control, when the angle difference is equal to or greater than the determination value, the display control unit determines the rotation amount such that a degree of rotation increases as the angle difference decreases.

(11)

The information processing apparatus according to any one of (5) to (10), wherein in the second display control, when the angle difference is equal to or greater than the determination value, the display control unit determines the rotation amount such that a degree of change in the rotation amount is smaller compared to a case where the angle difference is less than the determination value.

(12)

The information processing apparatus according to any one of (1) to (11), wherein in the second display control, when the line-of-sight direction in a current state and the line-of-sight direction in a previous state are substantially parallel, the display control unit moves the viewpoint of the imaging unit in the center-of-gravity movement direction without rotating the imaging posture of the imaging unit.

(13)

The information processing apparatus according to any one of (1) to (12), wherein in the second display control, when it is estimated that the line-of-sight direction in a current state and the line-of-sight direction in a previous state are not substantially parallel, and a gaze point of the user is not changed, the display control unit rotates the imaging posture of the imaging unit such that an image center of the visual field image approaches a direction of the gazing point.

(14)

The information processing apparatus according to any one of (1) to (13), wherein in the second display control, when it is estimated that the line-of-sight direction in a current state and the line-of-sight direction in a previous state are not substantially parallel, and a gaze point of the user is changed, the display control unit rotates the imaging posture of the imaging unit such that an image center of the visual field image approaches the line-of-sight direction in a current state.

(15)

The information processing apparatus according to any one of (1) to (14), wherein the display device is a head-mounted display worn by the user, and The display control unit causes a display unit of the head-mounted display to display the visual field image.

(16)

The information processing apparatus according to any one of (1) to (15), wherein the imaging unit is a virtual camera that generates a visual field image corresponding to an arbitrary viewpoint in a virtual space, and the display control unit causes the display device to display the visual field image corresponding to an imaging posture and a viewpoint of the virtual camera.

(17)

The information processing apparatus according to any one of (1) to (16), wherein the imaging unit is a real camera included in an unmanned moving body in a real space, and the display control unit causes the display device to display the visual field image according to an imaging posture and a viewpoint of the real camera.

(18)

The information processing apparatus according to any one of (1) to (17), wherein the display control unit executes the first display control and the second display control on a basis of a difference between the line-of-sight direction and the center-of-gravity movement direction in a horizontal direction and controls a movement amount related to a movement of a viewpoint of the imaging unit on a basis of the line-of-sight direction in a vertical direction.

(19)

An information processing method performed by a processor, the method comprising:

acquiring line-of-sight information related to a line-of-sight direction of a user;

acquiring a center-of-gravity movement information related to a center-of-gravity movement direction of a body of the user; and performing a first display control for controlling a display device to provide the user with a visual field image according to an imaging posture of an imaging unit by moving a viewpoint of the imaging unit in the center-of-gravity movement direction while substantially maintaining the imaging posture of the imaging unit when the line-of-sight direction and the center-of-gravity movement direction are substantially parallel and performing a second display control for controlling the display device to provide the user with the visual field image by rotating the imaging posture of the imaging unit and moving the viewpoint of the imaging unit in the center-of-gravity movement direction when the line-of-sight direction and the center-of-gravity movement direction are not substantially parallel.

(20)

A program for causing a computer to function as an information processing apparatus, wherein the information processing apparatus includes a line-of-sight information acquisition unit which acquires line-of-sight information related to a line-of-sight direction of a user, a movement information acquisition unit which acquires a center-of-gravity movement information related to a center-of-gravity movement direction of a body of the user, and a display control unit which performs a first display control for controlling a display device to provide the user with a visual field image according to an imaging posture of an imaging unit by moving a viewpoint of the imaging unit in the center-of-gravity movement direction while substantially maintaining the imaging posture of the imaging unit when the line-of-sight direction and the center-of-gravity movement direction are substantially parallel and performs a second display control for controlling the display device to provide the user with the visual field image by rotating the imaging posture of the imaging unit and moving the viewpoint of the imaging unit in the center-of-gravity movement direction when the line-of-sight direction and the center-of-gravity movement direction are not substantially parallel.

REFERENCE SIGNS LIST

10 Information processing apparatus
110 Movement information acquisition unit
120 Line-of-sight information acquisition unit
130 Display control unit
140 Imaging unit
150 Display unit
Sensor device
SD Line-of-sight direction
GD Center-of-gravity movement direction
MV Movement vector
DCR Direction correction area
ACR Movement amount correction area

The invention claimed is:

1. An information processing apparatus, comprising:
circuitry configured to:
acquire line-of-sight information associated with a line-of-sight direction of a user;
acquire a center-of-gravity movement information associated with a center-of-gravity movement direction of a body of the user;
determine whether the line-of-sight direction is parallel with the center-of-gravity movement direction;
control a first display of a visual field image based on the determination that the line-of-sight direction is parallel with the center-of-gravity movement direction, wherein
the center-of-gravity movement direction is in a horizontal direction,
the first display is to control a display device to provide the user with the visual field image, and
the control of the first display is based on a movement of a viewpoint of an imaging camera in the center-of-gravity movement direction; and
control a second display of the visual field image based on the determination that the line-of-sight direction is not parallel with the center-of-gravity movement direction, wherein
the control of the second display is based on an angle difference between the center-of-gravity movement direction and the line-of-sight direction, and
the control of the second display is performed by a rotation of an imaging posture of the imaging camera and the movement of the viewpoint of the imaging camera in the center-of-gravity movement direction.

2. The information processing apparatus according to claim 1, wherein in the second display,
the circuitry is further configured to determine a rotation direction based on the line-of-sight direction, and
the rotation direction is associated with the rotation of the imaging posture of the imaging camera.

3. The information processing apparatus according to claim 1, wherein in the second display,
the circuitry is further configured to rotate the imaging posture of the imaging camera, and
an image center of the visual field image approaches the line-of-sight direction based on the rotation of the imaging posture.

4. The information processing apparatus according to claim 1, wherein in the second display,
the circuitry is further configured to determine a rotation amount based on a magnitude of the angle difference between the line-of-sight direction and the center-of-gravity movement direction, and
the rotation amount is associated with the rotation of the imaging posture of the imaging camera.

5. The information processing apparatus according to claim 4, wherein in the second display, based on a comparison of the magnitude of the angle difference and a determination value, the circuitry is further configured to:
  determine the rotation amount; and
  move the viewpoint of the imaging camera in the center-of-gravity movement direction based on the rotation amount.

6. The information processing apparatus according to claim 5, wherein in the second display control, based on the magnitude of the angle difference is less than the determination value, the circuitry is further configured to:
  determine the rotation amount such that a movement direction of the viewpoint of the imaging camera curves toward the line-of-sight direction;
  rotate the imaging posture of the imaging camera in the center-of-gravity movement direction based on the rotation amount; and
  move the viewpoint of the imaging camera in the center-of-gravity movement direction based on the rotation amount.

7. The information processing apparatus according to claim 5, wherein in the second display, based on the magnitude of the angle difference is less than the determination value and a specific value, the circuitry is further configured to determine the rotation amount to decrease a degree of rotation of the imaging posture as the angle difference decreases.

8. The information processing apparatus according to claim 5, wherein
  in the second display, the circuitry is further configured to determine the rotation amount to increase a degree of rotation of the imaging posture as the angle difference decreases,
  the rotation amount is determined based on the magnitude of the angle difference,
  the magnitude of the angle difference is less than the determination value, and
  the magnitude of the angle difference is equal to or greater than a specific value.

9. The information processing apparatus according to claim 5, wherein in the second display, the circuitry is further configured to:
  determine the rotation amount to wrap a movement direction of the viewpoint towards the line-of-sight direction, wherein the rotation amount is determined based on the magnitude of the angle difference is equal to or greater than the determination value;
  rotate the imaging posture of the imaging camera in the center-of-gravity movement direction based on the rotation amount; and
  move the viewpoint of the imaging camera in the center-of-gravity movement direction based on the rotation amount.

10. The information processing apparatus according to claim 5, wherein
  in the second display, the circuitry is further configured to determine the rotation amount to increase a degree of rotation of the imaging posture as the angle difference decreases, and
  the rotation amount is determined based on the magnitude of the angle difference equal to or greater than the determination value.

11. The information processing apparatus according to claim 5, wherein
  in the second display, the circuitry is further configured to determine the rotation amount to determine a degree of change in the rotation amount,
  the degree of change in the rotation amount is associated with the angle difference that is less than the determination value, and
  the rotation amount is determined based on the magnitude of the angle difference is equal to or greater than the determination value.

12. The information processing apparatus according to claim 1, wherein
  in the second display, based on the line-of-sight direction in a current state and the line-of-sight direction in a previous state, the circuitry is configured to move the viewpoint of the imaging camera in the center-of-gravity movement direction without rotation of the imaging posture of the imaging camera,
  the current state and the previous state are associated with a time, and
  the line-of-sight direction in the current state is parallel with the line-of-sight direction in the previous state.

13. The information processing apparatus according to claim 1, wherein
  in the second display, the circuitry is further configured to rotate the imaging posture of the imaging camera based on the line-of-sight direction in a current state, the line-of-sight direction in a previous state, a gaze point of the user in the current state, and a gaze point of the user in the previous state,
  the current state and the previous state are associated with a time, and
  the line-of-sight direction in the current state is not parallel with the line-of-sight direction in the previous state,
  the gaze point of the user in the current state is similar to the gaze point of the user in the previous state, and
  an image center of the visual field image approaches a direction of the gazing point based on the rotation of the of the imaging posture.

14. The information processing apparatus according to claim 1, wherein
  in the second display, the circuitry is further configured to rotate the imaging posture of the imaging camera based on the line-of-sight direction in a current state, the line-of-sight direction in a previous state, a gaze point of the user in the current state, a gaze point of the user in the previous state, the current state and the previous state are associated with a time,
  an image center of the visual field image approaches the line-of-sight direction in the current state based on the rotation of the imaging posture of the imaging camera,
  the line-of-sight direction in the previous state is parallel with the line-of-sight direction in the current state, and
  the gaze point in the current state is different from the gaze point in the previous state.

15. The information processing apparatus according to claim 1, wherein
  the display device is a head-mounted display wearable by the user, and
  the circuitry is further configured to cause a display screen of the head-mounted display to display the visual field image.

16. The information processing apparatus according to claim 1, wherein
  the imaging camera is a virtual camera that generates the visual field image corresponding to an arbitrary viewpoint in a virtual space, and
  the circuitry is further configured to cause the display device to display the visual field image based on an imaging posture and a viewpoint of the virtual camera.

17. The information processing apparatus according to claim 1, wherein
the imaging camera is a real camera included in an unmanned moving body in a real space, and
the circuitry is further configured to cause the display device to display the visual field image based on an imaging posture and a viewpoint of the real camera.

18. An information processing method, comprising:
in an information processing apparatus:
acquiring line-of-sight information associated with a line-of-sight direction of a user;
acquiring a center-of-gravity movement information associated with a center-of-gravity movement direction of a body of the user;
determining whether the line-of-sight direction is parallel with the center-of-gravity movement direction;
controlling a first display of a visual field image based on the determination that the line-of-sight direction is parallel with the center-of-gravity movement direction, wherein
the center-of-gravity movement direction is in a horizontal direction,
the first display is to control a display device to provide the user with the visual field image, and
the control of the first display is based on a movement of a viewpoint of an imaging camera in the center-of-gravity movement direction; and
controlling a second display of the visual field image based on the determination that the line-of-sight direction is not parallel with the center-of-gravity movement direction, wherein
the control of the second display is based on an angle difference between the center-of-gravity movement direction and the line-of-sight direction, and
the control of the second display is performed by a rotation of an imaging posture of the imaging camera and the movement of the viewpoint of the imaging camera in the center-of-gravity movement direction.

19. A non-transitory computer-readable medium having stored thereon computer-executable instructions which, when executed by an information processing apparatus, cause the information processing apparatus to execute operations, the operations comprising:
acquiring line-of-sight information associated with a line-of-sight direction of a user;
acquiring a center-of-gravity movement information associated with a center-of-gravity movement direction of a body of the user;
determining whether the line-of-sight direction is parallel with the center-of-gravity movement direction;
controlling a first display of a visual field image based on the determination that the line-of-sight direction is parallel with the center-of-gravity movement direction, wherein
the center-of-gravity movement direction is in a horizontal direction,
the first display is to control a display device to provide the user with the visual field image, and
the control of the first display is based on a movement of a viewpoint of an imaging camera in the center-of-gravity movement direction; and
controlling a second display of the visual field image based on the determination that the line-of-sight direction is not parallel with the center-of-gravity movement direction, wherein
the control of the second display is based on an angle difference between the center-of-gravity movement direction and the line-of-sight direction, and
the control of the second display is performed by a rotation of an imaging posture of the imaging camera and the movement of the viewpoint of the imaging camera in the center-of-gravity movement direction.

* * * * *